United States Patent [19]
Mori et al.

[11] Patent Number: 5,209,011
[45] Date of Patent: May 11, 1993

[54] APPARATUS FOR GRAFTING IMMATURE PLANTS

[75] Inventors: Tatsuya Mori; Masahiro Cei; Shigeru Honda; Hitoshi Uemura; Chikaya Sakai; Ruriko Oda; Chiyoko Shimada; Yusaku Sekino, all of Hiratsuka, Japan

[73] Assignee: Kabushiki Kaisha Komatsu Seisakusho, Tokyo, Japan

[21] Appl. No.: 730,927

[22] PCT Filed: Jan. 19, 1990

[86] PCT No.: PCT/JP90/00064
 § 371 Date: Sep. 9, 1991
 § 102(e) Date: Sep. 9, 1991

[87] PCT Pub. No.: WO90/07869
 PCT Pub. Date: Jul. 26, 1990

[30] Foreign Application Priority Data
 Jan. 19, 1989 [JP] Japan .................................. 1-8595
 Feb. 13, 1989 [JP] Japan .................................. 1-31175

[51] Int. Cl.⁵ .............................................. A01G 1/06
[52] U.S. Cl. ............................................................ 47/6
[58] Field of Search .................... 47/1, 6, 7, DIG. 3

[56] References Cited

U.S. PATENT DOCUMENTS

| 107,427 | 9/1870 | Wagener | 47/6 |
| 4,601,129 | 7/1986 | Peev et al. | 47/6 |

FOREIGN PATENT DOCUMENTS

| 2051922 | 4/1972 | Fed. Rep. of Germany | 47/6 |
| 2602316 | 7/1977 | Fed. Rep. of Germany | 47/6 |
| 1144654 | 3/1985 | U.S.S.R. | 47/6 |
| 1475510 | 1/1987 | U.S.S.R. | 47/6 |

*Primary Examiner*—David A. Scherbel
*Assistant Examiner*—Michele A. Van Patten
*Attorney, Agent, or Firm*—Frost & Jacobs

[57] ABSTRACT

There is disclosed an immature plant grafting apparatus capable of seizing en bloc a plurality of saplings raised in array irrespective of a scatter in diameters of stems without requiring hand works and damaging the saplings and of grafting the saplings at a remarkably high efficiency but at low costs. The grafting apparatus has a plurality of induction plates (9a and 9b) formed with a plurality of induction grooves (10) open to seizing surfaces, corresponding to the number of saplings (3a and 3b) to be seized and their positions, induction plates so attached to upper and lower surfaces of one of a pair of seizing devices (4 and 5) as to protrude from the seizing surfaces, and buffer members (13) projecting from the seizing surfaces of the other seizing device so that each buffer member is fitted in between the pair of induction plates.

9 Claims, 23 Drawing Sheets

FIG. 28
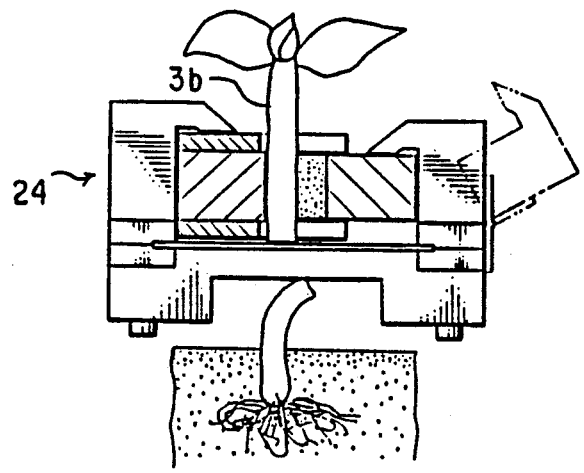
FIG. 29
FIG. 30
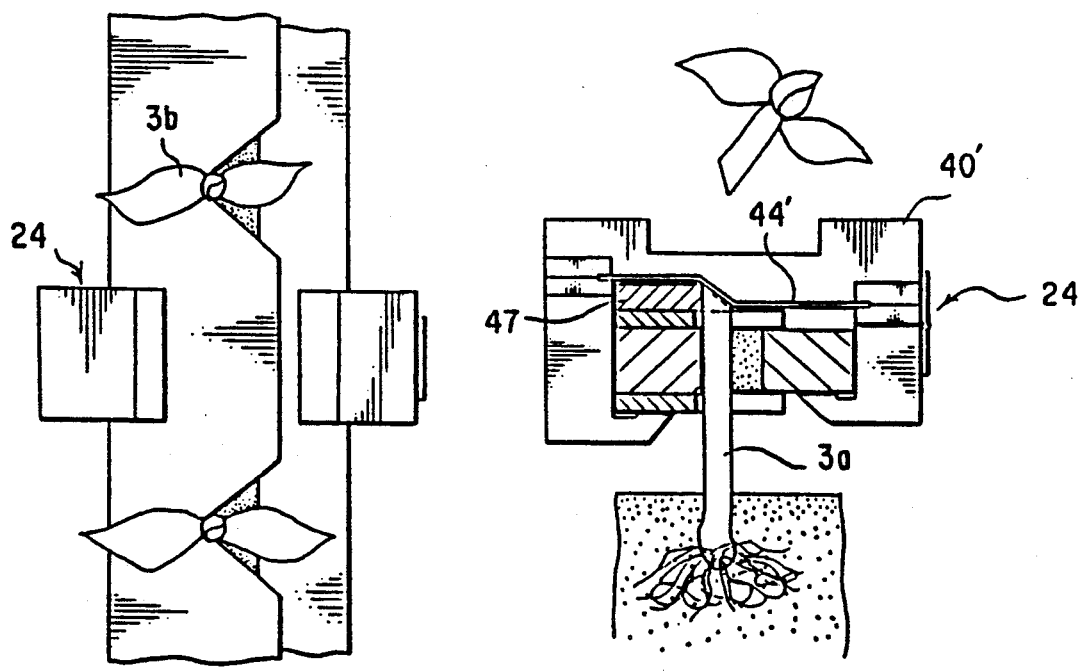

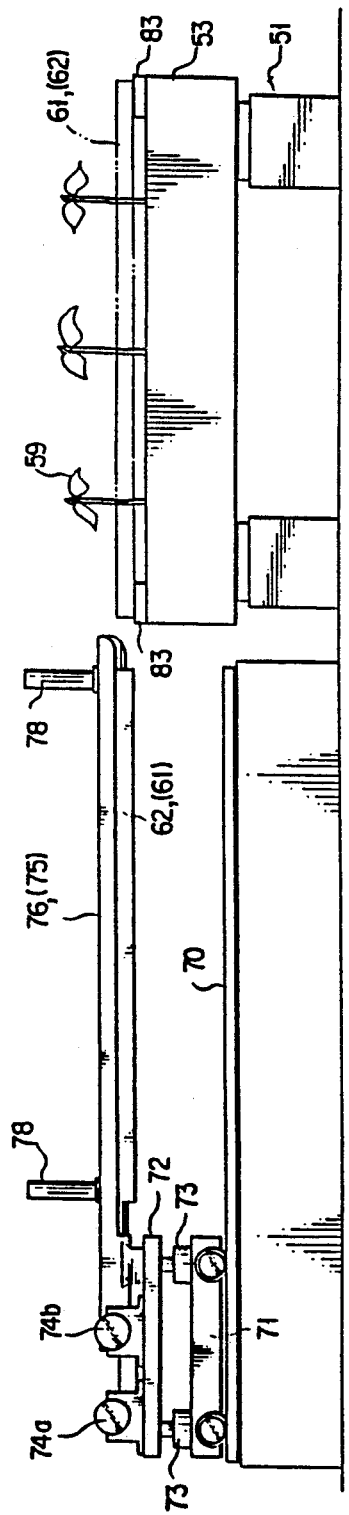
FIG. 33
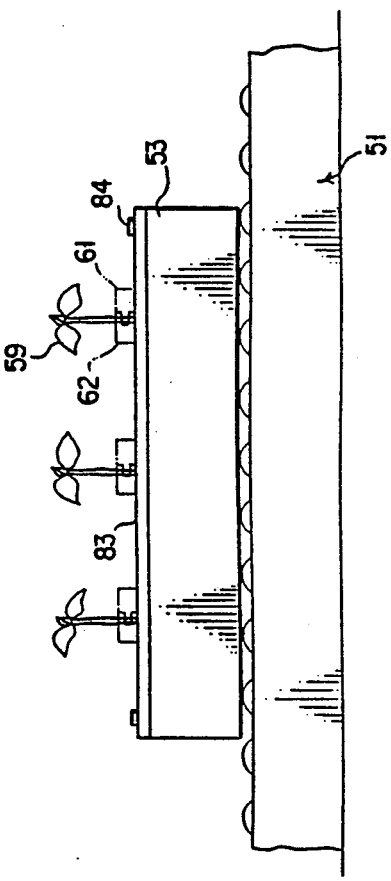
FIG. 34 第34図

APPARATUS FOR GRAFTING IMMATURE PLANTS

TECHNICAL FIELD

The present invention generally belongs to a technical filed of producing agricultural saplings such as vegetables, gardening plants and fruits, and is directed particularly to an immature plant grafting apparatus capable of performing mass productions of grafting saplings.

BACKGROUND ARTS

Grafting of immature plants has hitherto been developed by hand works of farmers. There are prepared stocks and scions, grafting parts of which are cut off by means a knife. Thereafter, the grafting parts are fixedly bundled with clips or strings and then employed as saplings after nurturing them.

In recent years, the number of agricultural workers who succeed to this grafting art has been decreased. Under such circumstances, grafting is in some cases performed by use of a robot or the like.

In the former conventional example, grafting is based entirely on the hand works which require a good deal of labors for manually cutting the stocks and scions and grafting them. In the latter case, the operations of men are merely replaced with mechanical operations.

For this reason, it is difficult to graft a tremendous number of saplings.

In the latter case, the worker performs the operation by recognizing a pattern while observing the saplings, If this operation is done by a computer-incorporated robot, there arise problems of requiring much time and expensive equipments. This leads to a rise in cost.

As prior art means for producing masses of grafting saplings, there are exemplified an apparatus for and a method of grafting immature plants, which involves the steps of seizing a plurality of saplings raised in array with a pair of seizing members, obtaining both stocks by cutting the saplings with upper portions of the seizing members and scions by cutting them with lower portions thereof while seizing them with the seizing members, superposing the scion on the stock, and thus grafting the two saplings.

The seizing tool employed in the prior art grafting apparatus is formed with semi-circular arc notches for seizing the stems of samplings.

The saplings seized by the seizing tool are singly cut off with an cutting edge like a razor.

The above-mentioned seizing tool is constructed to respectively seize the arrayed-saplings per line.

The seizing tool of the conventional apparatus for grafting the immature plants has such a restraint that the saplings raised in array have to be inserted one by one into the notches of the pair of seizing members of the seizing tool. If inserted, the sapling tends to come off while dealing with other saplings, which causes troublesomeness and requires labors for seizing the saplings. An additional operation required is to take countermeasures against a scatter in thickness of the stems which is due to differences between growth rates and forms by selecting the saplings adaptive to a predetermined diameter of the notch of the seizing tool and fostering the saplings till the stems adjust themselves to the notch diameter. This needs well-experienced techniques and knowledge. If the forms are different, and if the stems differ according to the times for grafting, a seizing tool has to be prepared according to the forms. When inserting the saplings into the notches of the seizing tool, the saplings are in some cases damaged, with the result that the samplings may probably be infected with diseases. The sapling stems are fixedly set in the notches each having the predetermined diameter, and hence deformations such as constrictions are produced in the stems according as the saplings grow. The deformed parts are stuck to the seizing members, which in turn leads to an easy-to-damage condition for the samplings.

Besides, the prior art grafting apparatus has drawbacks in which the saplings fostered in array in a sapling box are treated per line, whereby there are caused limits both to the number of saplings grafted en bloc and to a reduction in cost; and the grafting operations are sequentially carried out per sapling box, resulting in a probability that the saplings of the initially grafting line will have already drooped when grafting the saplings of the last line in the case of one-line-basis grafting. An additional drawback is that the saplings are to be damaged due to hindrance by samplings of the previous line.

Furthermore, it is difficult to operate the edge of the cutting tool adapted to the foregoing operations, and this causes a dangerous situation in which the fingers are to be hurt. In the case of a cutting tool with a shank, the shank impinges on other saplings and spoils them. The saplings are cut off by manually handling the cutting tool, and it follows that the operation becomes unstable. A fine cut face can not be obtained at one time. Besides, the cut face has to be confirmed each time, and a good deal of labors are required for such confirmations. A highly sophisticated technique is needed for obtaining the fine cut face, and it is difficult to cut the saplings catered for scions particularly with the lower portions of the seizing tool. The fact that it takes much time to cut the saplings presents a serious problem to the saplings for grafting which are fragile under a dried condition. This exerts great influences directly on a modulus of rootage and on a growth rate.

DISCLOSURE OF INVENTION

A first object of the present invention, which has been devised under such circumstances, to provide an immature plant grafting apparatus capable of seizing en bloc a plurality of saplings raised in array regardless of a scatter in diameters of stems thereof without requiring direct hand works of men and damaging the saplings.

A second object of the invention is to provide an immature plant grafting apparatus capable of grafting a plurality of saplings so raised as to be arranged in a plurality of lows per box with a view to remarkably reducing costs of production of the grafting saplings by outstandingly increasing the number of samplings grafted at one time and also improving a modulus of rootage of the grafting saplings.

A third object of the invention is to provide an immature plant grafting apparatus capable of cutting the respective saplings almost simultaneously per box with a cutting tool to obtain extremely fine cut faces with a facility but no necessity for a skillful technique.

A fourth object of the invention is to provide an immature plant grafting apparatus capable of grafting a plurality of saplings so raised as to be arranged in a plurality of lows per box with an extremely high efficiency on the basis of a belt conveyor mass production system.

To accomplish the above-mentioned first object, in accordance with a first mode of the present invention, there is provided an apparatus for grafting immature plants, comprising: a pair of seizing means for simultaneously seizing a plurality of saplings raised in arrays; a cutting tool for cutting the plurality of saplings seized by the seizing means with upper portions of the seizing means to obtain stocks but with lower portions thereof to obtain scions, respectively; and a means for superposing the seizing means which seizes a plurality of cut stocks obtained by removing the upper parts of the saplings on the seizing means which seizes the cut scions obtained by removing the lower parts thereof so that cut faces of the stocks and of the scions are fitted together, characterized in that upper and lower surfaces of one of the pair of seizing means are provided with plural pairs of induction plates chased with a plurality of induction grooves open to the seizing surface, corresponding to the number of seized saplings as well as to their positions, the induction plates being protruded from the seizing surface, and with buffer members protruded on the seizing surface of the other seizing means so that each of the buffer members is fitted in between the induction plates paired.

To accomplish the first and second objects, in accordance with a second mode of the present invention, there is provided an apparatus for grafting immature plants, comprising: a stock raising box for raising stocks; a scion raising box for raising scions; frame members so detachably attached to upper ends of the stock and scion raising boxes as to be capable of positioning; an induction seizing tool including a plurality of induction seizing members; and an induction seizing tool including a plurality of support seizing members, characterized in that the two seizing tools are mounted on the sapling raising boxes through the frame members in such a fitting state as to be movable in a seizing direction so that the seizing tools are able to seize the saplings raised in the respective sapling raising boxes by use of the seizing members, and the frame member attached to the scion raising box is positioned and superposed on the stock raising box.

To accomplish the first to third objects, in accordance with a third mode of the present invention, in the immature plant grafting apparatus stated in the second mode of the invention, there is provided the improvement characterized by further comprising: a holding means slidably fitted to the induction and support seizing members which are seizing the saplings; and a cutting tool having a cutting edge secured to an entire one surface of upper and lower surfaces of the holding means.

To accomplished the above-mentioned objects, in accordance with a fourth mode of the present invention, there is provided an apparatus for grafting immature plants, comprising: a first conveyor for sequentially carrying a plurality of stock raising boxes; a second conveyor, laid in parallel with the first conveyor, for sequentially carrying a plurality of scion raising boxes; seizing, cutting and grafting stations, arranged sequentially from an upstream side in the carrying direction of the two conveyors; a frame releasing station provided in continuation from the grafting station on the lowest stream side in the carrying direction of the first conveyor; seizing means, mounted on the respective seizing stations of the first and second conveyors, for seizing the saplings raised in array within the sapling raising boxes by use of an induction seizing member and a support seizing member and fixing the seizing members onto the sapling raising boxes in a state where the seizing members seize the saplings; a stock cutting means, mounted on the cutting station of the first conveyor, for cutting the saplings catered for stocks with upper portions of its seizing unit; a scion cutting means, mounted on the cutting station of the second conveyor, for cutting the saplings catered for scions with lower portions of the seizing unit thereof; a grafting means, mounted on the grafting station of the first conveyor, for fixedly superposing the scion saplings cut and separated from the lower parts of the saplings by the lower portions of the seizing unit while being seized by the seizing members on a sapling raising box for stocks obtained by cutting the upper parts of the saplings with the upper portions of the seizing unit, the lower parts thereof being seized by the seizing members; and a frame releasing means, mounted on the frame releasing station, for taking off the seizing members which seize the saplings after completely grafting the saplings.

According to the present invention, the saplings raised in array can be seized en bloc by the induction and support seizing tools regardless of a scatter in diameters of stems without requiring hand works and damaging the saplings. The seizing operations do not particularly require skillful techniques but can be performed with simplicity. The saplings are seized without damaging the saplings, and hence there is no possibility of infecting diseases from the damaged parts or adhering germs to the seizing members.

The saplings, which have been raised in a plurality of lows in the respective sapling boxes, can be grafted per box. As a result, the number of saplings which can be grafted en bloc remarkably increases. This conduces to an outstanding reduction in the production costs of the grafting saplings. The samplings can be grafted per box, thereby improving a modulus of rootage of the grafting saplings which are quite fragile under a dried condition.

Besides, it is possible to readily cut the saplings by use of cutting tools with no necessity for skillful techniques to obtain fine cut faces. The saplings are cut off almost simultaneously per box, and it is therefore feasible to graft the saplings with their cut faces being kept in an extremely fresh state. The saplings which are fragile under the dried condition can be grafted invariably in a favorable state.

In accordance with the present invention, the stock saplings and the scion saplings can be grafted at a high efficiency on the basis of a conveyor production system, which in turn leads to savings of labor for effecting the grafting operations and to a drop in the costs.

The above and other objects, modes and advantages of the present invention will become apparent to those skilled in the art during the following discussion taken in conjunction with the accompanying drawings and from the description which will deal with preferred embodiments in conformity with the principle of the invention.

BRIEF DESCRIPTION OF THE DRAWINGS

FIGS. 26 and 28 are vertical sectional views each illustrating a different cutting tool when being used;

FIG. 29 is a plan view showing a state where the saplings for scions are cut off;

FIG. 30 is a vertical sectional view depicting a cutting tool designed for oblique cutting;

FIGS. 32 through 36 are plan and side views each illustrating a seizing device employed in the second embodiment and vertical sectional views showing first and second principal portions thereof;

BEST MODE FOR CARRYING OUT THE INVENTION

Figure 1:
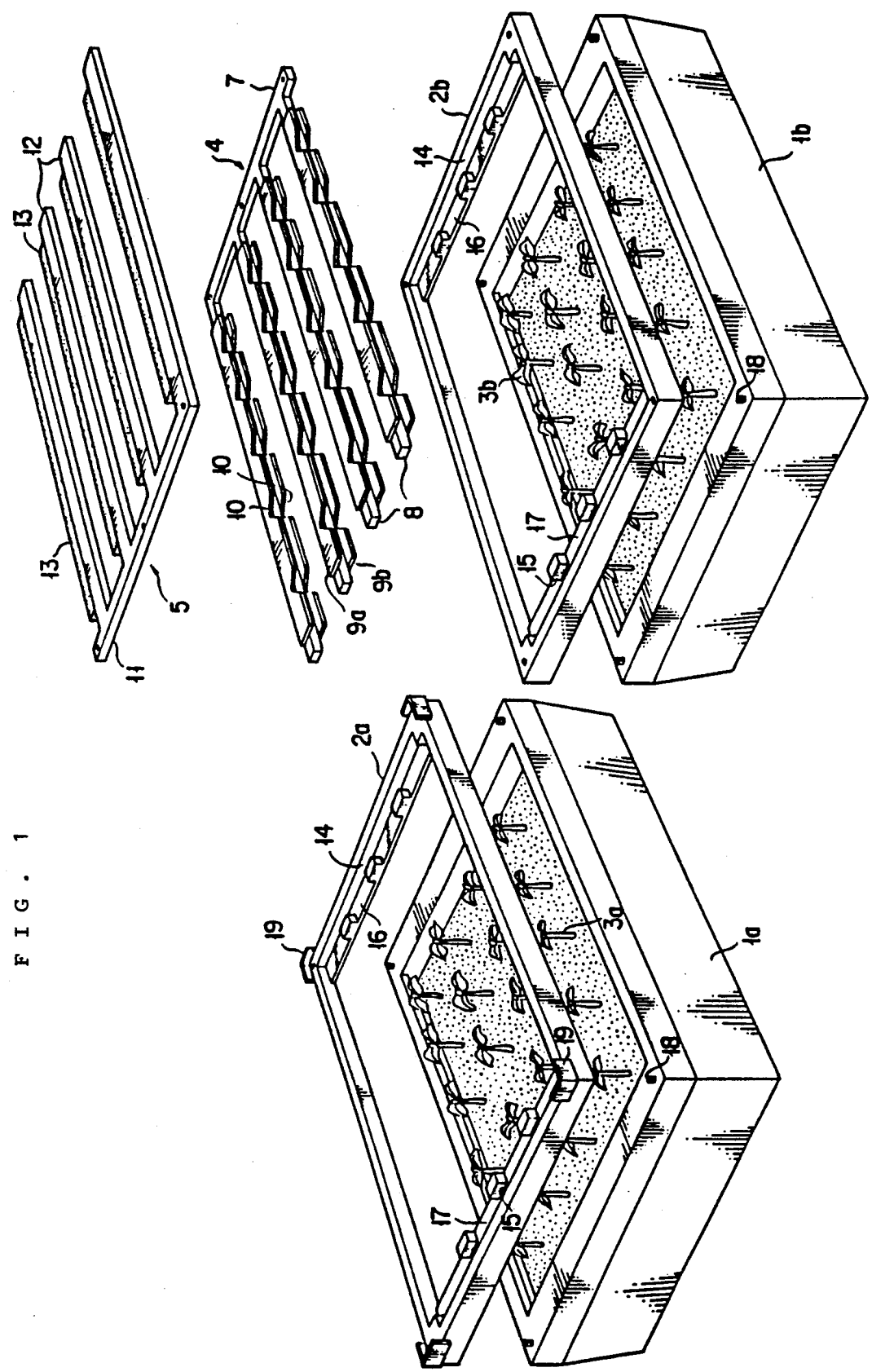
FIG. 1 is an exploded perspective view illustrating a first embodiment of the present invention.
Figure 2:
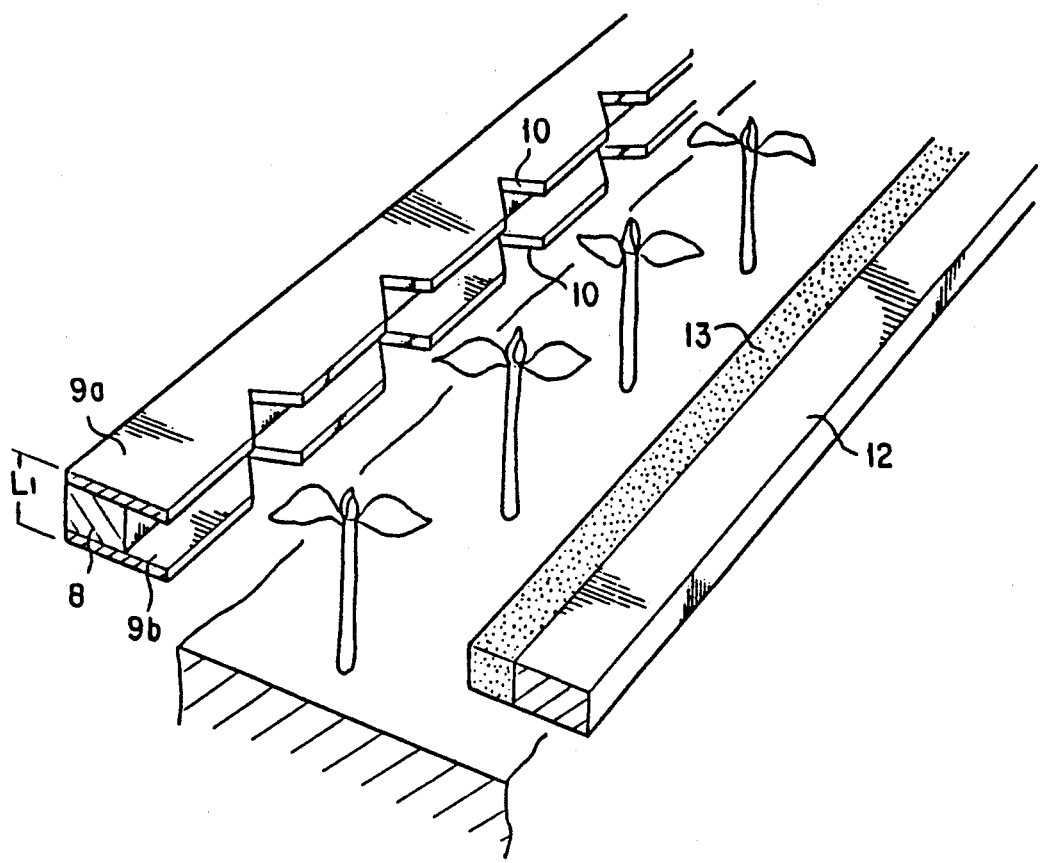
FIG. 2 is a perspective view showing in detail a seizing tool employed in the first embodiment.

A few preferred embodiments of the present invention will hereinafter be described in detail with reference to the accompanying drawings.

To start with, a first embodiment of the invention and variant forms thereof will be explained in conjunction with FIGS. 1 to 30.

Throughout the drawings, the reference symbols $1a$ and $1b$ represent sapling raising boxes, each assuming a rectangular configuration in plane and having a predetermined depth, for stocks and scions. Designated at $2a$ and $2b$ are frame members attached to circumferences of the sapling raising boxes $1a$ and $1b$. The sapling raising boxes $1a$ and $1b$, which are shaped in the same configuration, are employed. Stock saplings $3a$ are raised in corresponding positions in the sapling raising box $1a$ for stocks, while scion saplings $3b$ are fostered similarly in corresponding positions in a sapling raising box $1b$ for scions.

The numeral 4 denotes an induction seizing tool; and 5 stands for a support seizing tool. The seizing tools 4 and 5 are alternately fitted to the frame members $2a$ and $2b$ so that a multiplicity of saplings $3a$ and $3b$ grown in a plurality of lows in the sapling raising boxes $1a$ and $1b$ are simultaneously seized.

The induction seizing tool 4 includes a lateral wood member 7 provided with a plurality, e.g., four pieces of induction seizing members 8 arranged in parallel to assume comb-toothed configuration. Fixed to upper and lower surfaces of the seizing members 8 are upper and lower induction plates $9a$ and $9b$ formed in the same shape and overhanging from the seizing surface of the seizing member 8, these overhangings being formed with a multiplicity of V-shaped induction grooves 10 arranged at equal spacings in the longitudinal direction. A depth of each induction groove 10 is set on the same level or sightly deeper than the seizing surface of the seizing member 8. The upper and lower induction plates $9a$ and $9b$ are fitted to seizure operating portions of the seizing member 8; and a thickness dimension L1 from the upper surface to the lower surface of the upper and lower induction plates $9a$ and $9b$ of the induction seizing tool 4 is set equal to a thickness of the frame member $2a$ or $2b$.

The support seizing member 5 is so constructed that a lateral wood member 11 is equipped with four pieces of support seizing members 12 corresponding to the seizing members 8 of the induction seizing tool 4. A seizing side surface of the seizing member 12 is fitted with a buffer member 13 like a sponge having an elasticity. Each of the seizing member 12 and the buffer member 13 has a thickness adapted to insertion in between the induction plates $9a$ and $9b$.

The seizing tools 4 and 5 are, as described above, alternately attached to the frame members $2a$ and $2b$. Formed on both sides of the frame members $2a$ and $2b$ in the opposite direction are grooves 14 and 15 in which the lateral wood members 7 and 11 are fitted and notched grooves 16 and 17 to which the seizing members 8 and 12 correspond. The grooves 14 to 17 have sizes enough to make the seizing tools 4 and 5 movable in the seizing direction while being fitted therein.

Depths of the grooves 14 to 17 are, when the lateral wood members 7 and 11 of the seizing tools 4 and 5 are fitted in these grooves, so set that the upper surface of the upper induction plate $9a$ of the induction seizing tool 4 is flush with the upper surfaces of the frame members $2a$ and $2b$.

In connection with the frame members $2a$ and $2b$, particularly the frame member $2b$ attached to the scion sapling raising box $1b$ is caught by, e.g., guide pins 18 protruded at every corner of the sapling raising box $1b$ so as to be easily attachable to and detachable from the box $1b$ in predetermined positions.

Provided at every corner of the frame member $2a$ for stocks is a positioning piece 19 for positioning when effecting superposition of the scion frame member $2b$.

Based on the construction given above, the saplings for stocks are raised in the stock sapling raising box $1a$, while the sapling $3b$ for scions are fostered in corresponding positions in the scion sapling raising box $1b$.

When grafting the sapling $3a$ and $3b$, the induction seizing tool 4 is fitted in the grooves 14 and 16 of the frame members $2a$ and $2b$ of the sapling raising boxes $1a$ and $1b$. At this time, the induction seizing tool 4 is moved in the seizing direction from a position slightly away from a position in which the saplings $3a$ and $3b$ are seized. As a result, the saplings $3a$ and $3b$ are induced by the V-shaped induction grooves 10 of the induction plates $9a$ and $9b$ provided on the upper and lower surfaces of the seizing members 8 and moved along the seizing surfaces of the seizing members 8, whereby the saplings $3a$ and $3b$ are positioned at predetermined spacings in lows along the seizing members 8. In this state, the induction seizing tool 4 is fixed to the frame members 2a and 2b with screws or the like.

Figure 3:
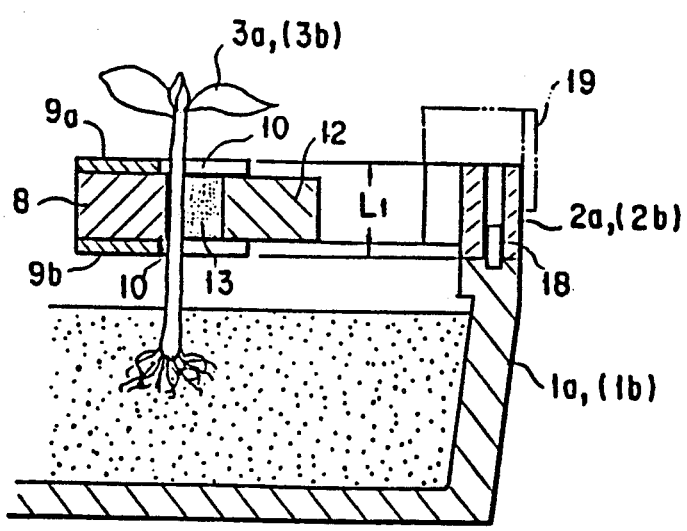
FIG. 3 is a sectional view illustrating a seizing state of the seizing tool depicted in FIG. 2.

Next, the support seizing tool 5 is fitted in the grooves 15 and 17 formed on the opposite side of the frame members 2a and 2b. At this time, the support seizing tool 5 is, as in the case of the induction seizing tool 4, moved from a position slightly away from the above-mentioned seizing position. Each seizing member 12 is fitted in between the induction plates 9a and 9b of each seizing member 8 of the induction seizing tool 4; and the sapling 3a and 3b accommodated in the induction grooves 10 of the induction plates 9a and 9b are seized with the aid of the buffer members 13. In a state where the saplings 3a and 3b grasped by predetermined seizing forces, the support seizing tool 5 is fixed to the frame members 2a and 2b with screws or the like. Turning to FIG. 3, there is illustrated the seizing state where the upper surface of the induction seizing tool 4 is flush with the upper surfaces of the frame members 2a and 2b.

At this time, tip portions of the seizing members 8 and 12 of the seizing tools 4 and 5 are fitted in the notched grooves 16 and 17 disposed vis-a-vis therewith, with gaps being formed on the opposite side to the seizing direction. Then, wedges 20 are intruded into these gaps, thereby stably fixing the tip portions of the cantilevered seizing members 8 and 12.

Figure 5:
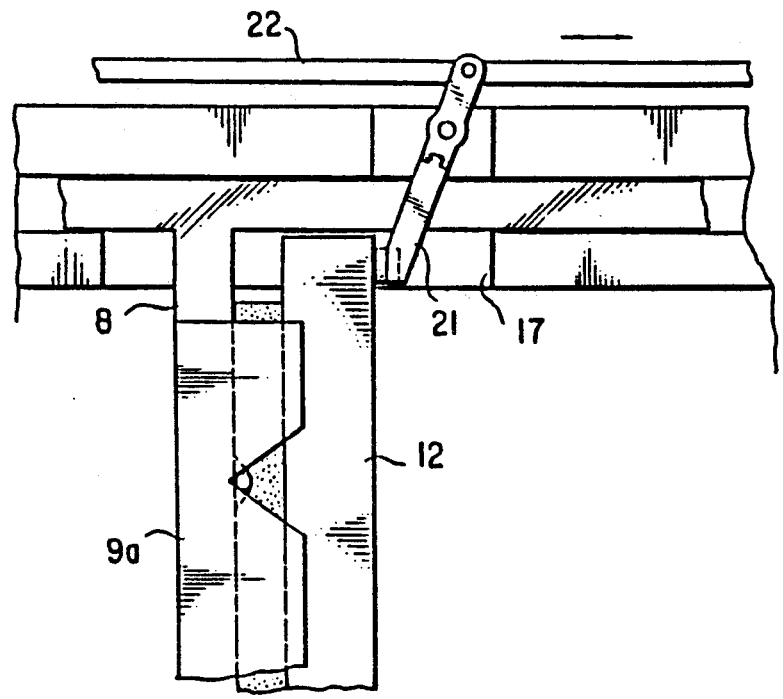
FIGS. 5 and 6 are partial plan views showing tangible examples, different from each other, of a means for fixing tip portions of the seizing member.
Figure 6:
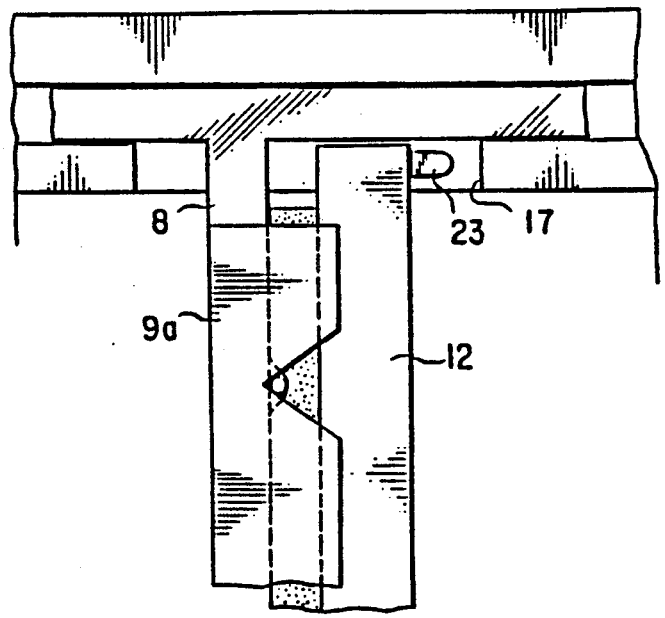

The wedge 20 may be made an elastic material such as a rudder or a leaf spring as well as of a solid material. These wedges 20 have to be intruded singly thereinto but may be arranged in such a way that, as illustrated in FIG. 5, levers 21 are disposed in positions corresponding to the seizing members 8 and 12 and interlock with linkage members 22 to thrust the rear surfaces of top portions of the seizing members 8 and 12. Another arrangement is that, as depicted in FIG. 6, protrudent members 23 for imparting spring biasing forces in their protruding directions in positions opposite to the rear surfaces of the seizing members 8 and 12 are so located as to be retractable in positions where the top portions of the seizing members 8 and 12 correspond thereto, and the rear surfaces of seizing members 8 and 12 are held by the protrudent members 23 which protrude in the seizing state after intruding the protrudent members 23 during the seizing operation.

The saplings 3a and 3 b for stocks and scions which have been fostered in the sapling raising boxes 1a and 1b are caught by the seizing tools 4 and 5, respectively.

Figure 4:
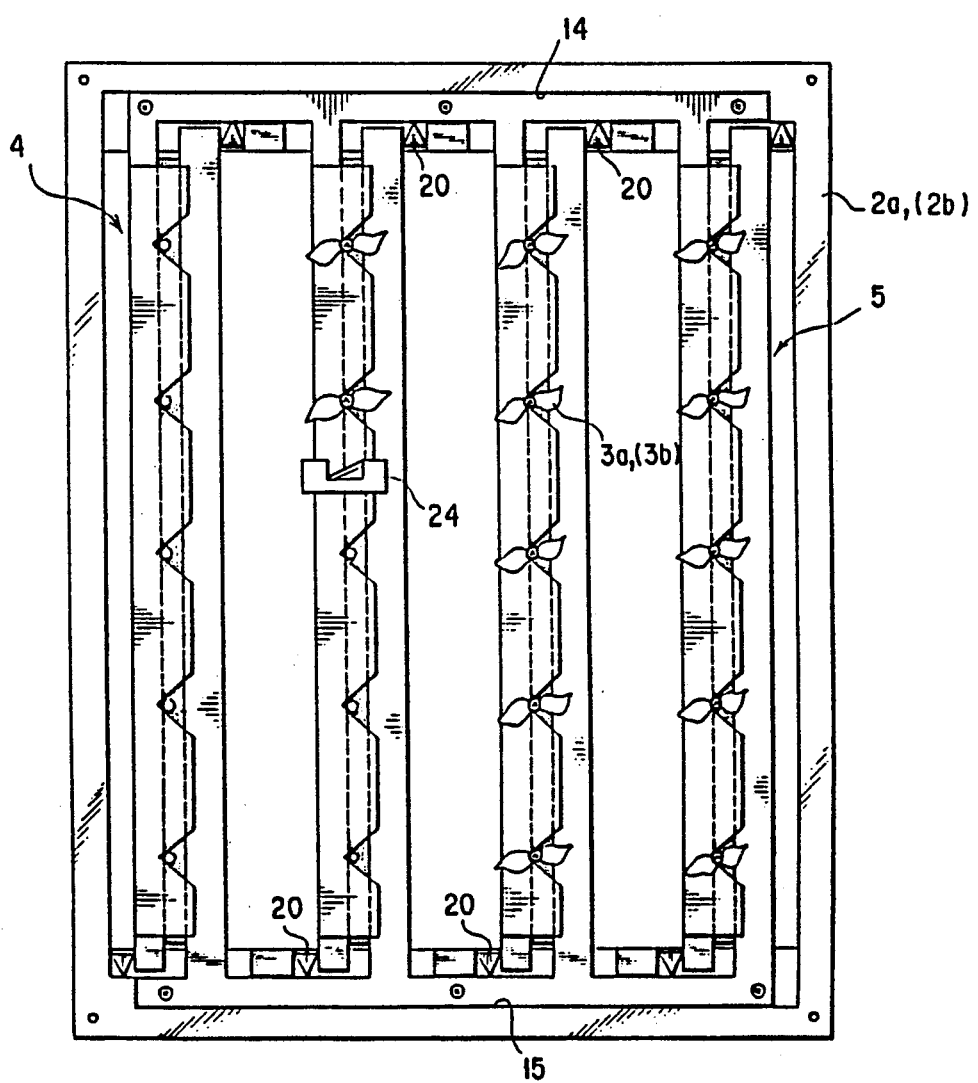
FIG. 4 is a plan view of the first embodiment of the invention of FIG. 1.

In this state, the saplings 3a for scions are cut off by a cutting tool 24 depicted in FIG. 4 on the side of an upper surface of the induction seizing tool 4, while the saplings 3b for scions are cut off by the cutting tool 24 on the side of a lower surface of the induction seizing tool 4. At this time, the respective cut faces are arranged to be flush with or a little bit protrude from the upper or lower surface of the induction seizing tool 4.

Next, the frame member 2b holding the scion saplings 3b are dismounted from the sapling raising box 1b and then superposed on the frame member 2a holding the stock saplings 3a.

Figure 7:
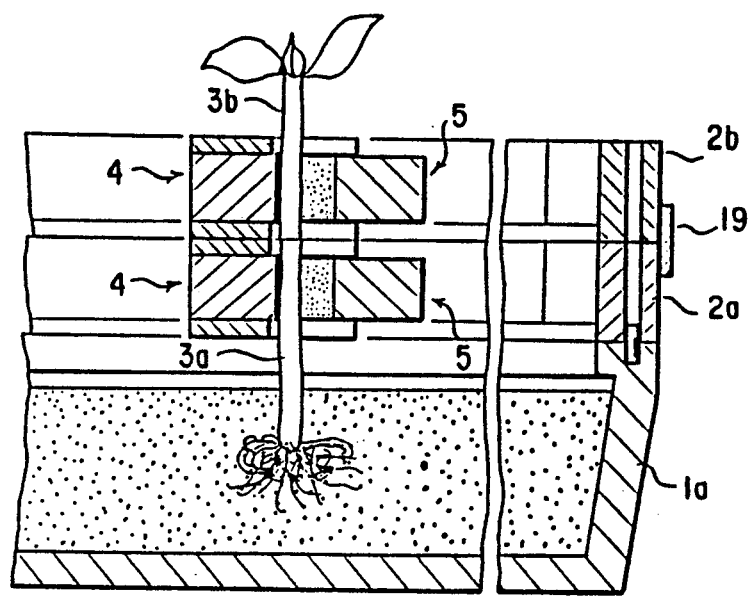
FIG. 7 is a vertical sectional view showing a grafting state in the first embodiment.

At this time, positions of the two frame members 2a and 2b are determined by the positioning pieces 19 so that lower ends of the scion saplings 3b, as illustrated in FIG. 7, contiguously face to upper ends of the stock saplings 3a.

The saplings 3a and 3b are left as they are for a predetermined period, with the result that the stock saplings 3a become integral with the scion saplings 3b, thus completing the grafting process.

At this time, the cut faces of the stock saplings 3a fixed per frame may be sprayed with a growth adjusting agent or a germicide by use of a spray. The cut faces of the scion saplings 3b may be sprayed likewise with the drugs or undergo a drug treatment while being immersed in a drug bath per frame member.

The frame member 2a provided for stocks may be integral with the sapling raising box 1a; or alternatively the function of the frame member 2a may be given to circumference of the sapling raising box 1a.

Figure 8:
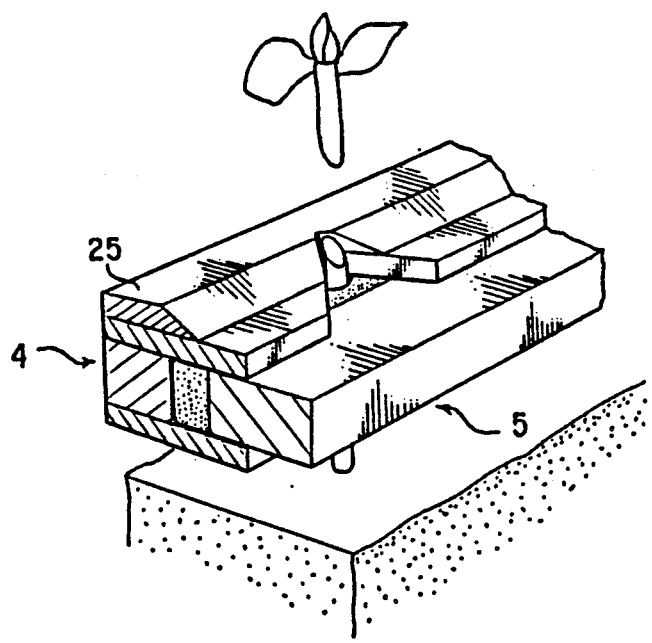
FIGS. 8 to 12 inclusive are partial views in vertical section, illustrating tangible examples, different from each other, of a cut configuration in section.
Figure 9:
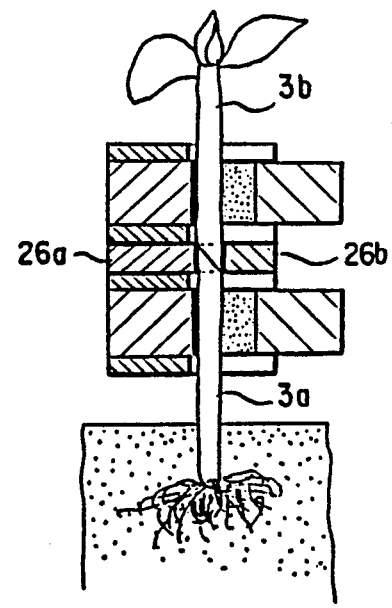

During the cutting operation, as depicted in FIG. 8, a tilt cutting plate 25 is set along the cutting face of the induction seizing tool 4, and the cutting tool 24 is made to move along the surface of the plate 25, whereby the saplings are obliquely cut off. The stock and scion saplings 3a and 3b are cut off in the same direction, and the cut faces thereof are fitted together while being guided along the tilt cutting plates 25 and 25 to exhibit a state shown in FIG. 9. Tilt grafting is thus effected. Note that at this time spacers 26a and 26b each having a thickness equal to a plate thickness of the tilt cutting plate 25 are interposed between the frame members 2a and 2b superposed on each other.

Figure 10:
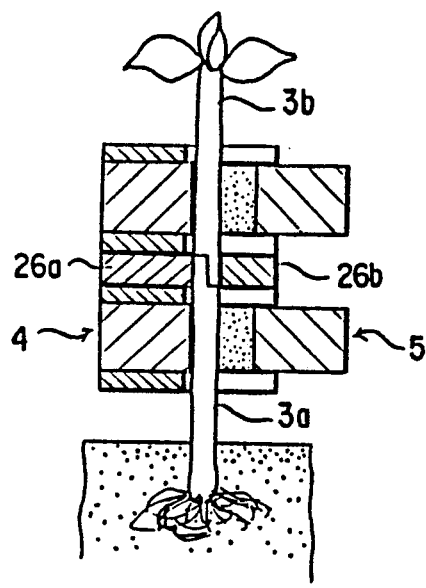

Referring to FIG. 10, there is shown stepped grafting as another example of tilt grafting. The stepped grafting process involves the use of stepped cutting plates 26 and 26.

Figure 11:
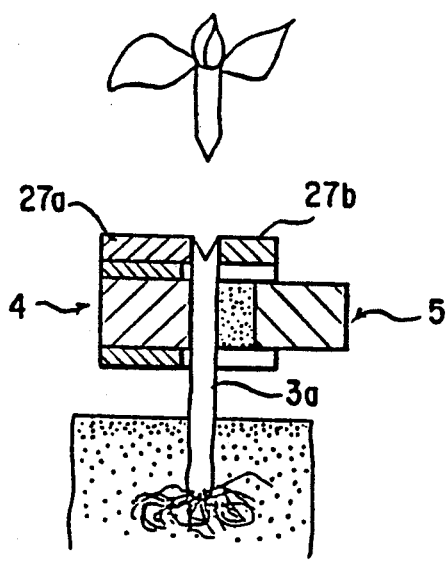
Figure 12:
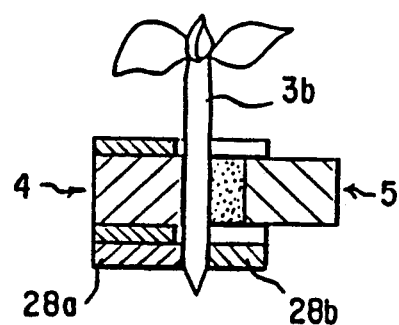

FIGS. 11 and 12 further shows other examples of the cutting configuration. Referring to FIG. 11, the stock saplings 3a is cut off in a protrudent V-shape by use of protrudent V-shaped cutting plates 27a and 27b. Turning to FIG. 12, the scion sapling 3b is cut off in a recessed V-shape by use of cutting plates 28a and 28b each assuming the recessed V-shape. The thus cut saplings 3a and 3b are, as in the case of tilt grafting, fitted together for grafting them.

Figure 13:
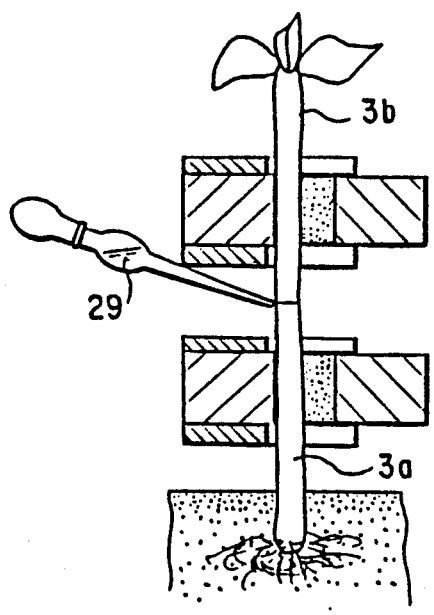
FIGS. 13 to 25 inclusive are explanatory views showing tangible examples, different from each other, of a grafting part.
Figure 14:
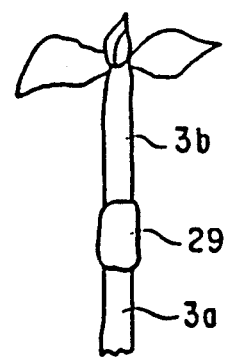
Figure 15:
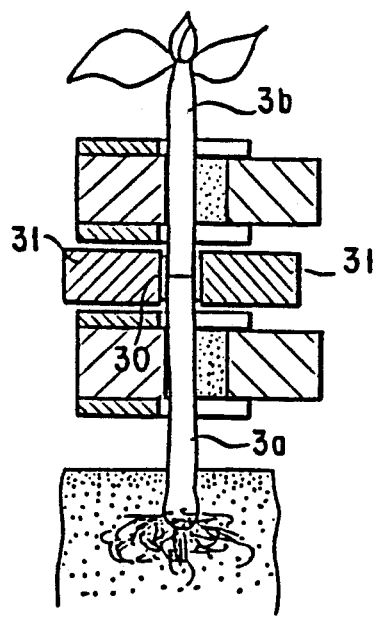
Figure 16:
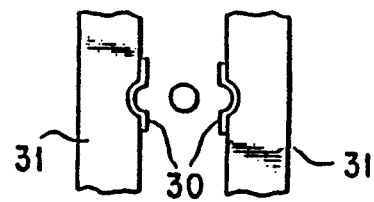

FIGS. 13 to 25 inclusive illustrate other embodiments. In the embodiment of FIGS. 13 and 14, the saplings 3a and 3b are cut off to form elongate cut parts by means of a spacer, and these cut parts are grafted with a bonding agent 29. In the embodiment shown in FIGS. 15 and 16, the elongate cut parts are grasped by seizure sticking tolls 31 and 31 fitted with an adhesive tape, thus grafting them.

In these two embodiments, there is no necessity for fixing the seizing tools 4 and 5 till the grafting process is finished. The seizing tools 4 and 5 can be removed while the saplings 3a and 3b are tightly connected by means of the bonding agent 29 and the adhesive tape 30. Hence, the number of the seizing tools 4 and 5 required can considerably be reduced.

Figure 17:
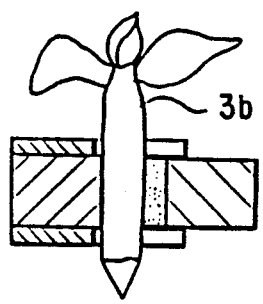
Figure 18:
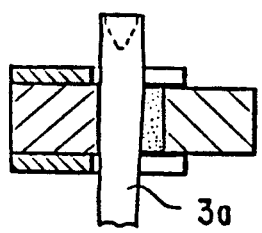

FIGs. 17 and 18 in combination illustrate still another example of the configuration of the cut part, wherein the cut part of one sapling is formed with a recessed hole, while the other cut part is formed with a protrusion. The protrusion engages with the recessed hole, thus grafting the saplings.

Figure 19:
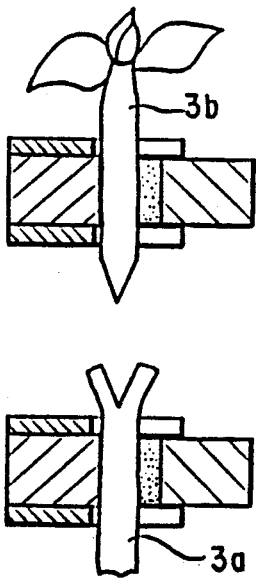
Figure 20:
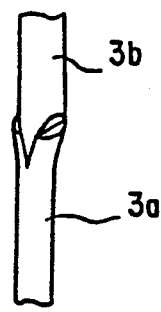
Figure 21:
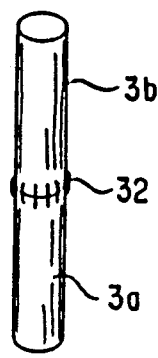
Figure 22:
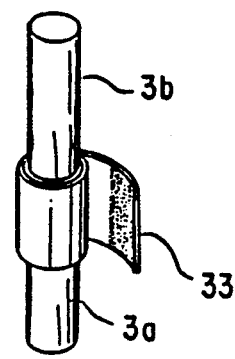
Figure 23:
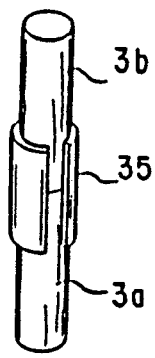
Figure 24:
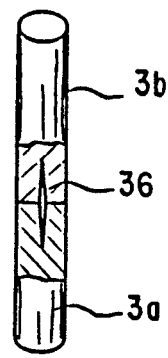

Referring to FIGS. 19 and 20, the cut part of one saplings is split, while the cut part of the other sapling is formed with a tongue piece. The tongue piece is inserted into the split part, thus grafting one sapling into the other.

Additional examples are that the cut parts are sewed together with a yarn 32 (FIG. 21) or wound with a bandage 33 (FIG. 22) or fitted with a pipe or a splint 35

Figure 25:
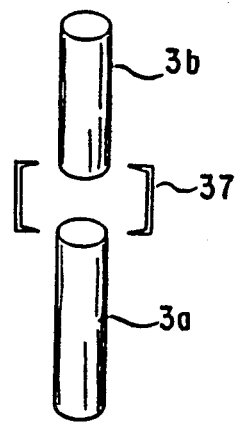
Figure 26:
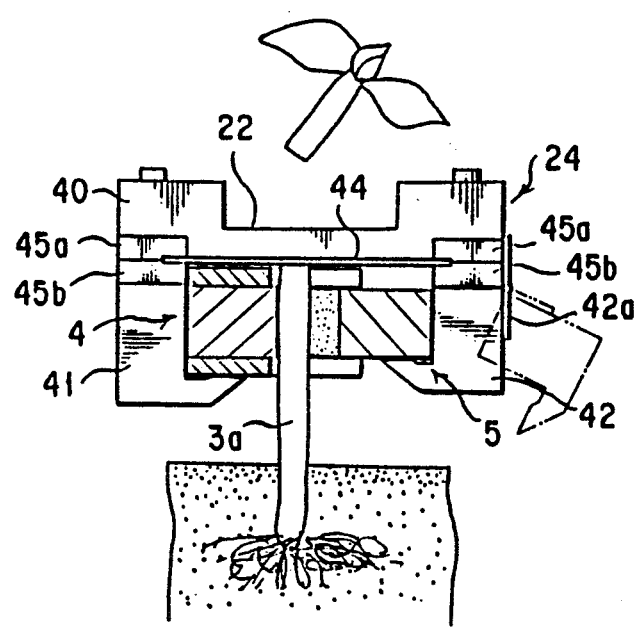
Figure 27:
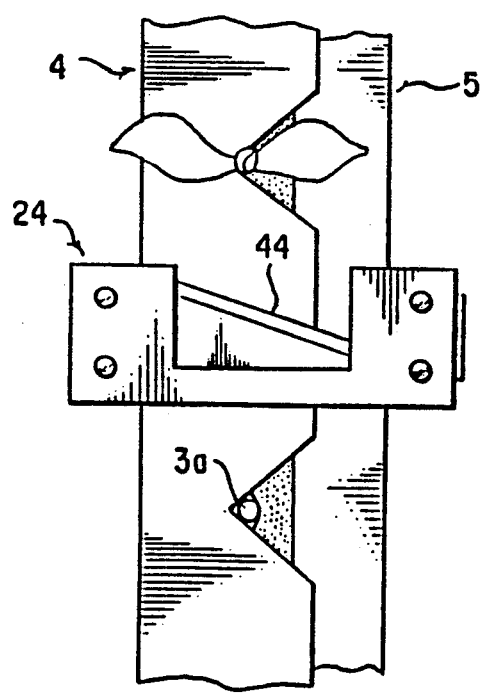
FIG. 27 is a plan view showing a state where the samplings for stocks are cut off.

(FIG. 23) or joined with a pin 36 (FIG. 24) or with a needle 37 of a stapler (FIG. 25).

FIGS. 26 through 30 in combination show a tangible construction of the cutting tool 24.

Throughout these Figures, the numeral 40 designates a cut face side member set along the cut face; 41 a first engaging member for slidably engaging with the rear surface of the induction seizing tool 4; and 42 a second engaging member for slidably engaging with the rear surface of the support seizing tool 5. The first engaging member 41 is fixed to one side portion of the cut face side member 40, while the second member 42 is rotatably linked through a hinge member 42a to the other side portion of the cut face side member 40 while being spring-biased in an engaging direction. Secured to the cut face side member 40 is a cutting edge 44 retained by seizing the both sides thereof with seizure-sticking members 45a, 45b, 46a and 46b such as rubbers having large frictional forces.

Based on this construction, the second engaging member 42 is inserted into the rear surface of the induction seizing member 8 of the induction seizing tool 4 by rotating the second engaging member 42. At this time, the seizing tools 4 and 5 which are catching at the stock saplings 3a are so positioned that the cut face side member 40 is positioned toward the upper surfaces thereof. Subsequently, the second engaging member 42 is made to revert to its original state and then engaged with the support seizing tool 5, whereby a cutting tool 24 is slidably brought into engagement along the seizing tools 4 and 5 while the cutting edge 44 is set along the upper surface of the induction seizing tool 4.

A spicate part of the stock saplings 3a which protrudes upwardly of the seizing tool 4 is cut off (FIG. 26) by moving the cutting tool 24 in that state.

On the other hand, the cutting tool 24 is fitted to the seizing tools 4 and 5 (FIG. 28) which are catching the scion saplings 3b in such manner that the cutting face side member 40 is located on the side of the lower surface of the induction seizing tool 4.

The scion sapling 3b is cut off with the lower portion of the seizing tool 4 by moving the cutting tool 24 in that state while being grasped by the seizing tools 4 and 5.

At this time, heights of the cut faces of the saplings 3a and 3b are kept constant.

FIG. 30 shows a further example, wherein a cutting space 47 catches a lower surface of a cutting face side member 40', and a cutting edge 44' assuming a corresponding configuration is fitted thereto with the intention of performing a slant cutting process., Subsequently, a second embodiment of the present invention and variant forms thereof will hereinafter be described with reference to FIGS. 31 through 52.

Figure 31:
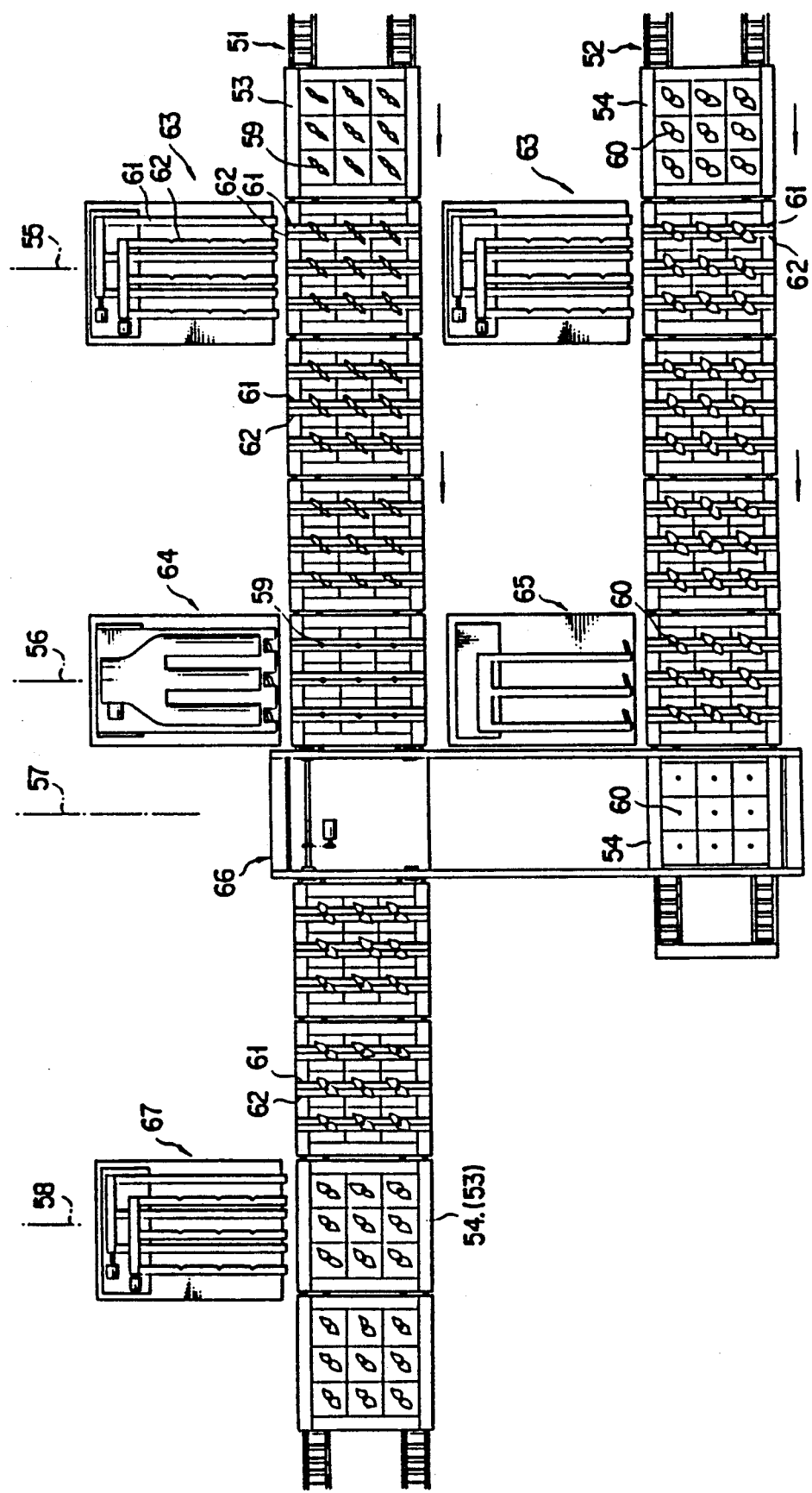
FIG. 31 is a schematic plan view depicting a whole construction of a second embodiment of the present invention.
Figure 32:
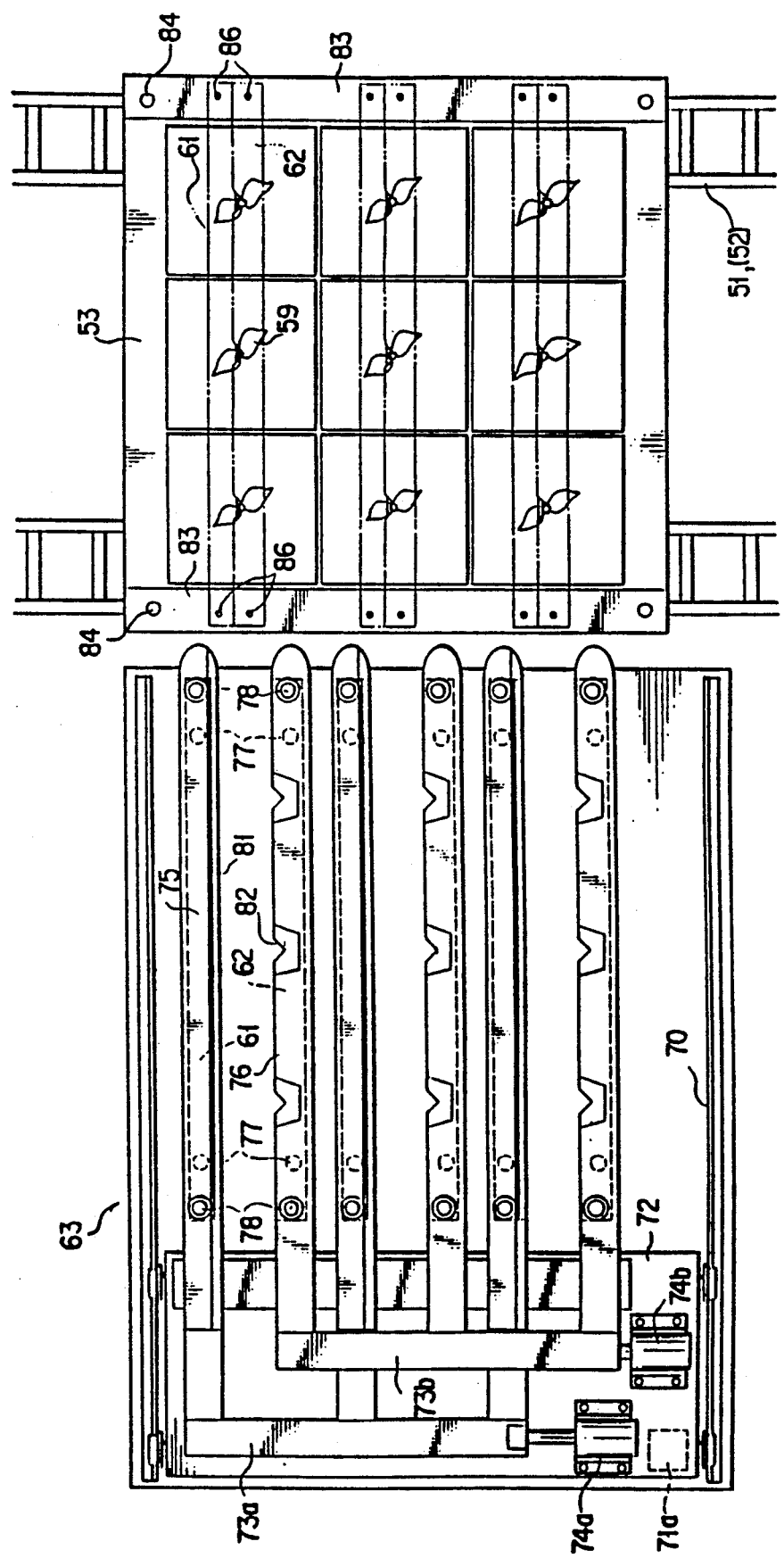
Figure 35:
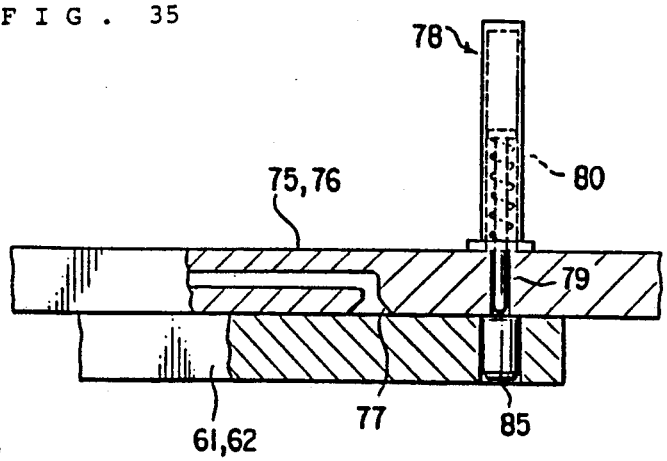

Referring to FIG. 31, the numeral 51 denotes a first conveyor; and 52 a second conveyor. These conveyors 51 and 52 are disposed in parallel with each other at a given spacing. The numeral 53 represents a sapling box for stocks, and the numeral 54 indicates a sapling box for scions. The stock sapling box 53 is intermittently carried from the right to the left by the first conveyor 51 in synchronization therewith, while the scion sapling box 54 is intermittently carried by the second conveyor 52 in synchronization therewith.

The stock and scion saplings 59 and 60 are arranged by threes in the same positions, e.g., in three lows within the sapling raising boxes 53 and 54 and raised there.

A conveyor unit composed of the conveyors 51 and 52 is provided with a seizing station 55, a cutting station 56, a grafting station 57 and a frame releasing station 58 sequentially in the carrying direction. The seizing station 55 is mounted with seizing devices 63 and 63 for seizing the saplings 59 and 60 of each low within the sapling boxes 53 and 54 which are disposed on the conveyors 51 and 52 and positioned at the station 55 in cooperation with a catching plate 61 and a guide plate 62, the seizing devices 63 being located aside of the conveyors 51 and 52. The cutting station 56 is equipped with a stock cutting device 64 for cutting the stock saplings 59 in the sapling box 53 positioned at the cutting station 56 by use of upper portions of the catching plate 61 and the guide plate 62 and with a scion cutting device 65 for cutting the scion saplings 60 in the sapling box 54 by use of lower portions of the catching plate 61 and the guide plate 62, these cutting devices 64 and 65 being disposed aside of the conveyors 51 and 52. The grafting station is mounted with a grafting device 66 for fitting together the cut faces of the saplings 59 and 60 by superposing the holder plate 61 and the guide plate 62, which catch the scion saplings 60 in the sapling box 54 on the second conveyor 52 positioned at the grafting station 57, on the catching plate 61 and the guide plate 62 which hold the stock saplings 59 in the sapling box 53 on the first conveyor 51. In addition, the frame releasing station 58 is provided with a frame releasing device 67 for releasing, from the grafted saplings, two sets of catching plates 61 and guide plates 62 which are superposed on each other at the grafting station, the frame releasing device 67 being located aside of the first conveyor 51.

A seeding device and an environmental control device for germination may be provided on the upstream side of the two conveyors. The seeding device capable of seeding in predetermined positions is employed. If some of the stock and scion saplings 59 and 60 can not be germinated and are remarkably deteriorated in their growth, a device for replacing such defective saplings may be provided on the upstream side thereof. These devices may utilize an optical system used for production of plug saplings for the purpose of detecting presence or non-presence and sizes of the saplings.

Constructions and functions of the respective devices located in the individual positions of the conveyor unit will be explained as follows.

FIGS. 32 through 36 illustrate the seizing devices 63 and 63. A descriptive priority is herein given to the device for seizing the stock sapling 59.

Designated at 70 and 70, as illustrated in these Figures, are guide rails laid aside of the first conveyor 51 and set in a direction orthogonal to this conveyor 51. A carriage generally indicated at 71 is movably loaded on the guide rails 70 and is driven by a motor 71a. The numeral 72 represents a base board so mounted on the carriage 71 as to be movable up and down by a cylinder 73. Disposed on the base board 72 are a pair of support frames 73a and 73b movable in the carrying direction of the conveyor 51 by use of cylinders 74a and 74b. Fixed to one support frame 73a are proximal ends of three pieces, corresponding to the number of sapling lows in the sapling box 53, of plate holders 75 arranged at the same spacings as those of the sapling lows. Fixed to the other support frame 73b are proximal ends of guide plate holders 76 standing vis-a-vis with the catching plate holders 75. These holders 75 and 76 are cantilever-supported thereon. Provided in two positions of the lower surfaces of the respective holders 75 and 76 in the longitudinal direction are vacuum support devices 77 and 77 for holding the catching plate 61 and the guide plate 62 on their lower surfaces so that these plates can be engaged therewith and disengaged therefrom. Fixing pin driving devices 78 and 78 are provided downwards outwardly of the vacuum support devices 77 and 77 in the longitudinal direction. The fixing pin driving device 78 consists of a pin pushing rod 79 which is moved down by the air and a tensile spring 80 for lifting the pin pushing rod 79.

A cushion material 81 such as a rubber is fitted to a grasping face of the catching plate 61. Chased in each of grasping faces of the guide plate 62 and the guide plate holder 76 are V-shaped grooves 82 each depressed by the cushion material 81 of the catching plate 61 while guiding the saplings 59 in the sapling box 53. Fixed on both sides to the upper surface of the sapling box 53 with pins 84 are spacers 83 and 83 formed with pin holes 86 with which to engage stopper pins 85 so provided at both ends of the catching plate 61 and of the guide plate 62 as to be slidable up and down.

The fixing pin driving devices 78 and 78 of the catching plate holder 75 and the guide plate holder 76 are mounted on a station 5 opposite to the stopper pins 85 which have been plugged beforehand into the holes of the respective plates 61 and 62 held by the holders 75 and 76.

The function of the thus constructed seizing device 63 will hereinafter be described.

The carriage 71 is retreated, and at the same moment the catching plate holder 75 and the guide plate holder 76 are separated away from each other. In this state, the catching plate 61 and the guide plate 62 are adsorptively supported on the holders 75 and 76 by means of the vacuum support devices 77 and 77. The catching plates 61 and the guide plates 62 are fed one by one by a stacker device (not illustrated) located under the holders 75 and 76. Note that the plates 61 and 62 may be held by the holders 75 and 76 with the aid of magnets.

Under the above-mentioned condition, the carriage 71 is moved forward at a predetermined stroke, whereby the respective holders 75 and 76 advance in between the saplings 59 of the sapling box 53. Then, the catching plate 61 and the guide plate 62 are disposed on both sides of the saplings 59 in such positions that the guide grooves of the guide plate 62 stand vis-a-vis with the individual saplings 59.

In the wake of this step, the support frames 73a and 73b move in the grasping direction to effect the seizing operation, and the respective saplings 59 are caught by the guide grooves 82 formed in the guide plate 62 in cooperation with the cushion materials 81 of the catching plate 61.

Figure 36:
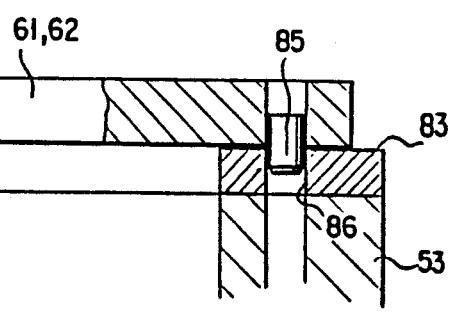

Thereafter, the stopper pins 85 caught by the catching plate 61 and the guide plate 62 are protruded downwardly of the plates 61 and 62 by operating the fixing pin driving devices 78 of the holders 75 and 76. The plates 61 and 62 are, as illustrated in FIG. 36, secured to the spacers 83 and 83 with the fixing pins 85.

In this state, the vacuum support devices 77 are released, and the plates 61 and 62 are separated from the holders 75 and 76. Then retreats the carriage 71.

On the basis of the operations discussed above, the catching plate 61 and the guide plate 62 are fixed to the spacers 83 and 83 of the sapling box 53 while the catching plate 61 and the guide plate 62 seize the respective saplings 59.

The description given above has dealt with a case of the stocks. The operations are, however, absolutely the same with the scions.

In the above-described operations, up-and-down positions of the catching plate 61 and the guide plate 62 are adjusted by cylinders 73 and 73 supporting the base board 72.

The next explanation will be centered on the stock cutting device 64 and the scion cutting device 65 in conjunction with FIGS. 37 through 44.

Figure 37:
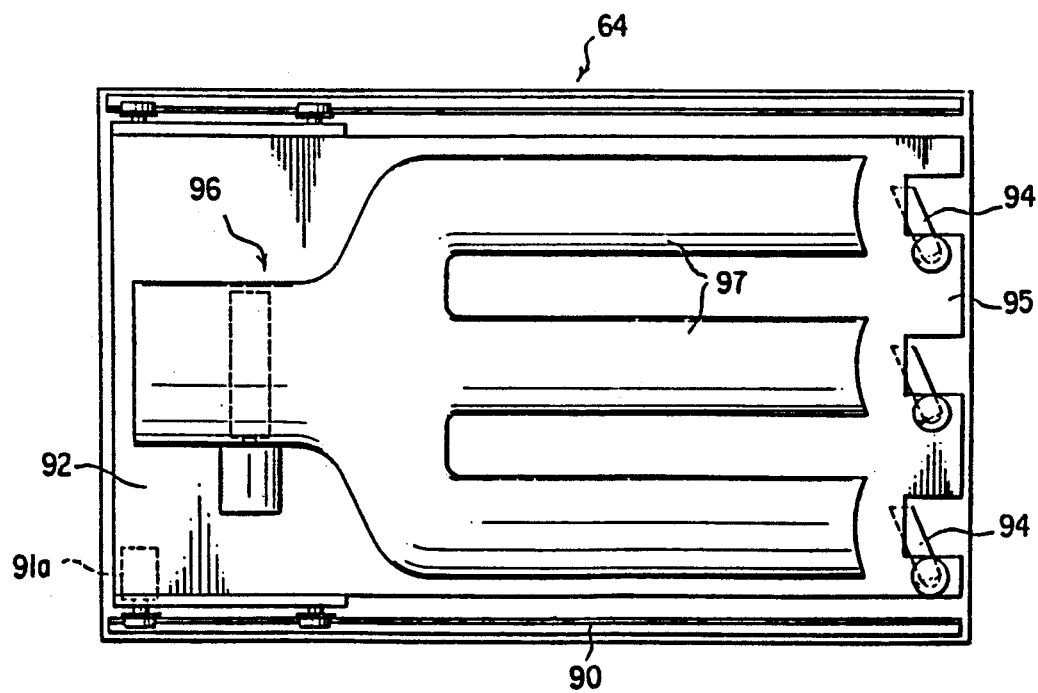
FIGS. 37 through 39 are plan, side and front views each depicting a stock cutting device.
Figure 38:
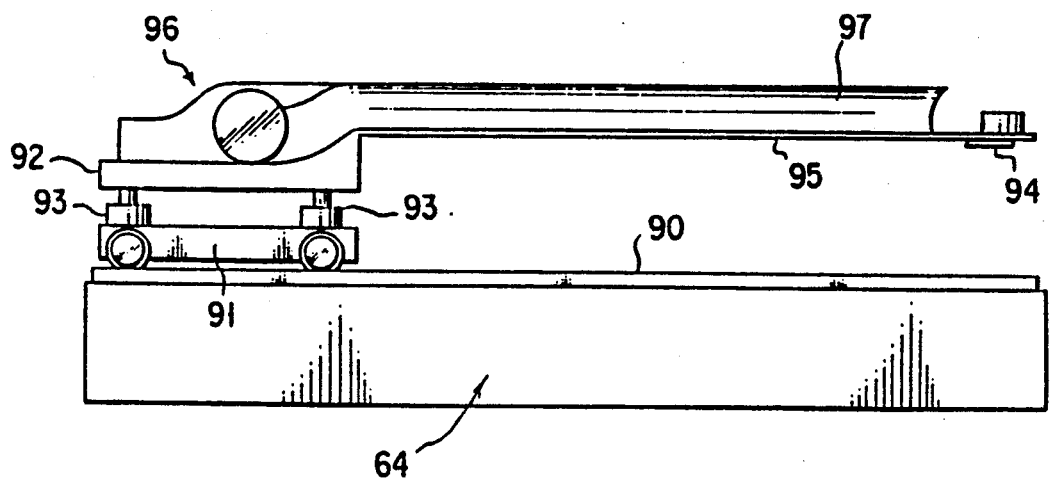
Figure 39:
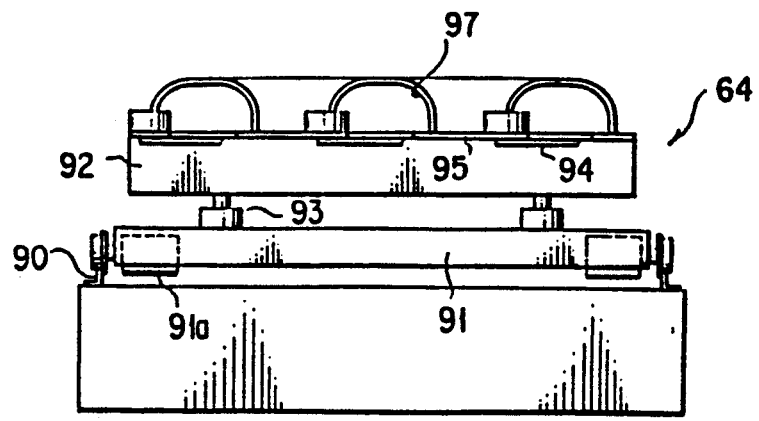
Figure 40:
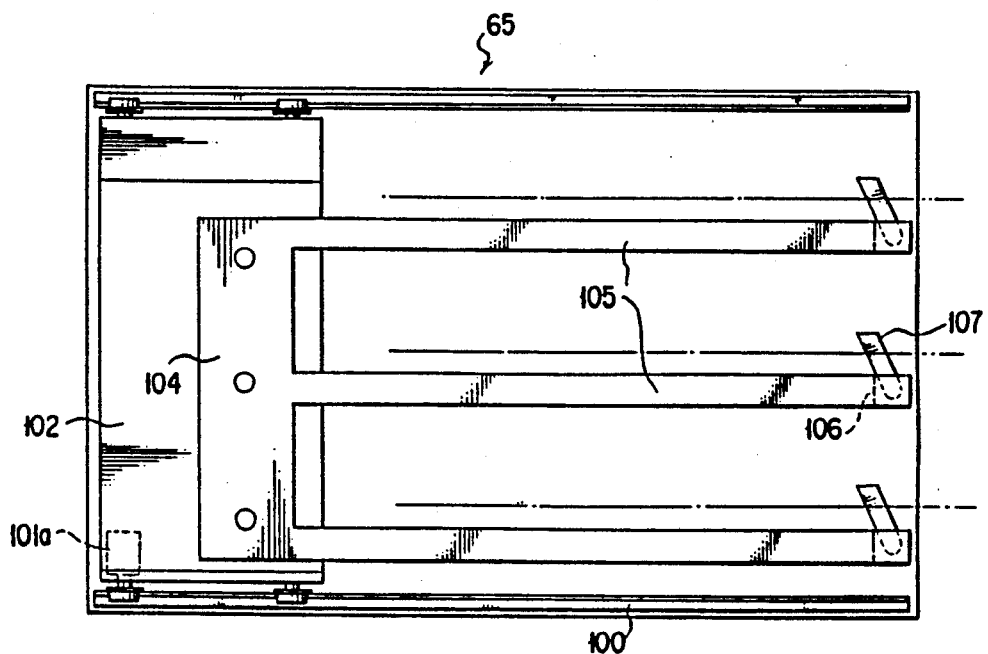
FIGS. 40 through 44 are plan, side and front views each illustrating a scion cutting device and a diagram of assistance in explaining a cutter function.
Figure 41:
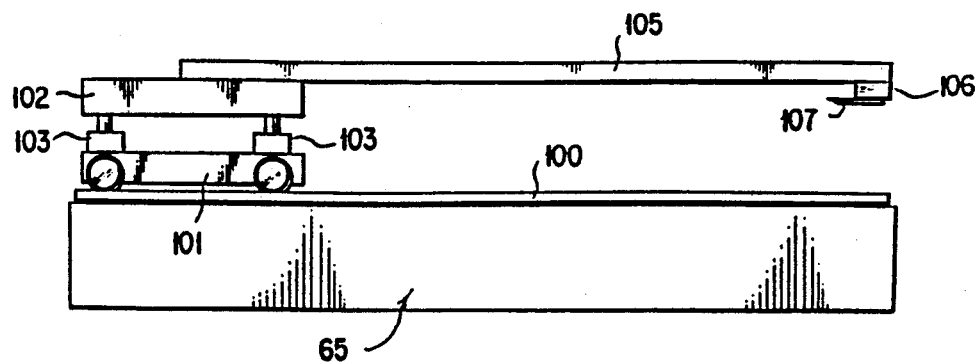
Figure 42:
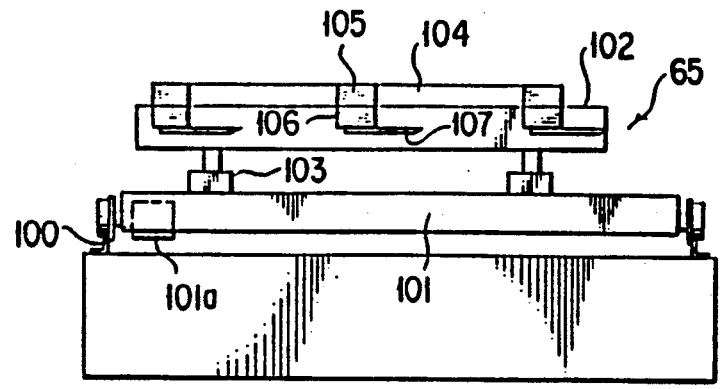
Figure 43:
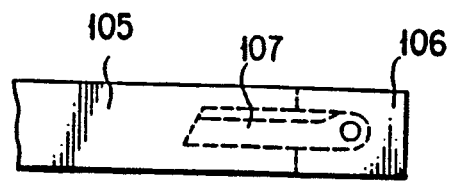
Figure 44:
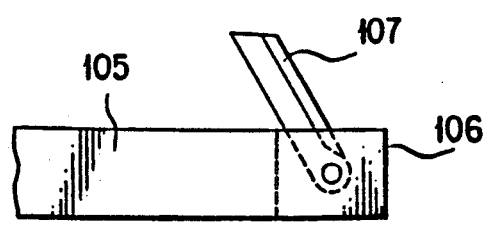

FIGS. 37 to 39 depict the stock cutting device 64. In these Figures, the reference numerals 90 represent guide rails laid aside of the first conveyor 51 and set in a direction right-angled to this conveyor 51. Designated at 91 is a carriage movably loaded on the guide rails 90 and driven by a motor 91a. A base board generally indicated at 92 is so mounted on the carriage 91 as to be movable up and down by means of a cylinder 93. Cantilever-fixed to the base board 92 is a proximal end of a cutter support board 95 to which to fix a plurality of, i.e., a corresponding number of cutters 94 to the number of lows of the saplings 59 of the sapling box 53 on the underside of the top portion thereof. Disposed oppositely above the cutters 94 are suction ducts 97 each communicating with a suction blower device 96 mounted on the cutter support board 95. Heights of the cutters 94 of the stock cutting device 64 are adjusted to such positions as to slide along the upper surface of the guide plate 62 by means of the cylinder 93.

Turning to FIGS. 40 through 44, there is illustrated the scion cutting device 65. In these Figures, the numerals 100 denote guide rails laid aside of the second conveyor 52 and set in a direction orthogonal to the second conveyor 52. Designated at 101 is a carriage movably loaded on the guide rails 100 and driven by a motor 101a. A base board generally denoted at 102 is so mounted on the carriage 101 as to be vertically movable by means of a cylinder 103. A proximal end of a cutter support board 104 is cantilever-fixed to the base board 102. The cutter support board 104 is provided with protruded cutter support rods 105 the number of which corresponds to the number of lows of the saplings arranged in the sapling box 54. Cutters 107 movable by a motor 106 are secured to lower portions of tips of the cutter support rods 105. The cutter 107 is adapted to rotate from a position (FIG. 43) in which the cutter is hidden by the cutter support rod 105 to a position (FIG. 44) in which the cutter overhangs sideways while being directed to the second conveyor 52.

The functions of the stock cutting device 64 and the scion cutting device 65 which have the above-described constructions will hereinafter be explained.

To begin with, the carriage 91 is moved forward from a state in which the carriage 91 has been retreated in the stock cutting device 64. As a result, the base board 92 advances together with the carriage 91, and the cutters 94 fixed to the top portion thereof move along the upper surface of the guide plate 62, thereby cutting upper parts of the saplings 59 projecting upwardly of the guide plate 62. The cut parts are sucked via the suction ducts 97 and then ejected. At this time, the heights of the cutters 94 are controlled by adjusting a level of the base board 92 by means of the cylinder 93.

In the second place, the carriage 101 is made to advance from a state in which the carriage 101 has been retreated in the scion cutting device 65, as a result of which the base board 102 moves forwards together with the carriage 101. Then, the cutter support rod 105 advances in between the scion saplings 60 arranged in the sapling box 54. At this time, the base board 102 is lowered by the cylinder 103 so that the cutters 107 are positioned under the guide plate 62 in a state where the tip of the cutter support rod 105 enters the sapling box 54, thus adjusting the heights of the cutters 107. Thereafter, the cutters 107 are rotated sideways by driving the motor 106, whereby the respective cutters 107 overhang in such positions as to interfere with the saplings 60 while the cutters 107 move along the underside of the guide plate 62. In this state, the carriage 101 is moved forwards, and it follows that the saplings 60 are cut off along the lower surface of the guide plate 62. The cut parts are seized by the catching plate 61 and the guide plate 62, at which time the heights of the cutters 107 are controlled by adjusting the level of the base board 102 by use of the cylinder 103.

Figure 45:
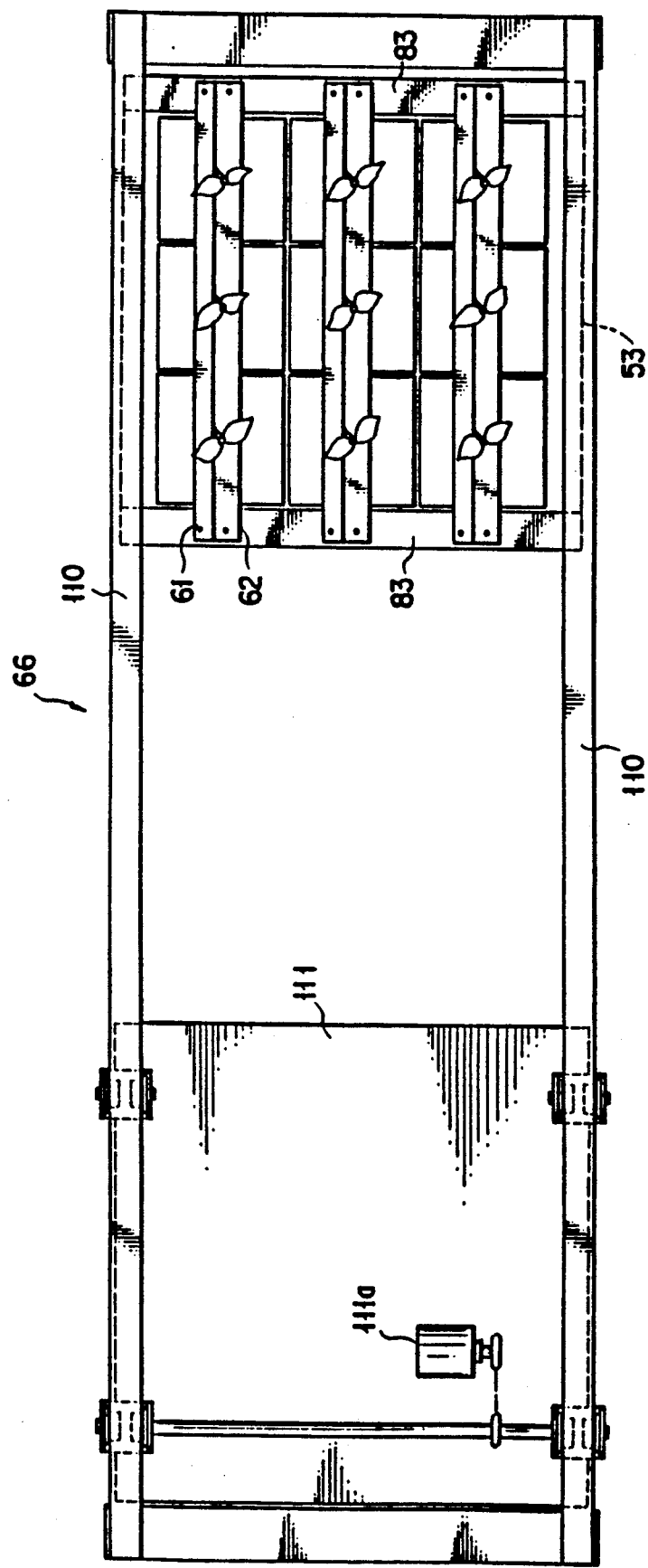
FIGS. 45 through 49 are plan, side and front views each illustrating a grafting apparatus and a sectional view showing a heaping principal portion of a seizing unit on a frame releasing station.
Figure 46:
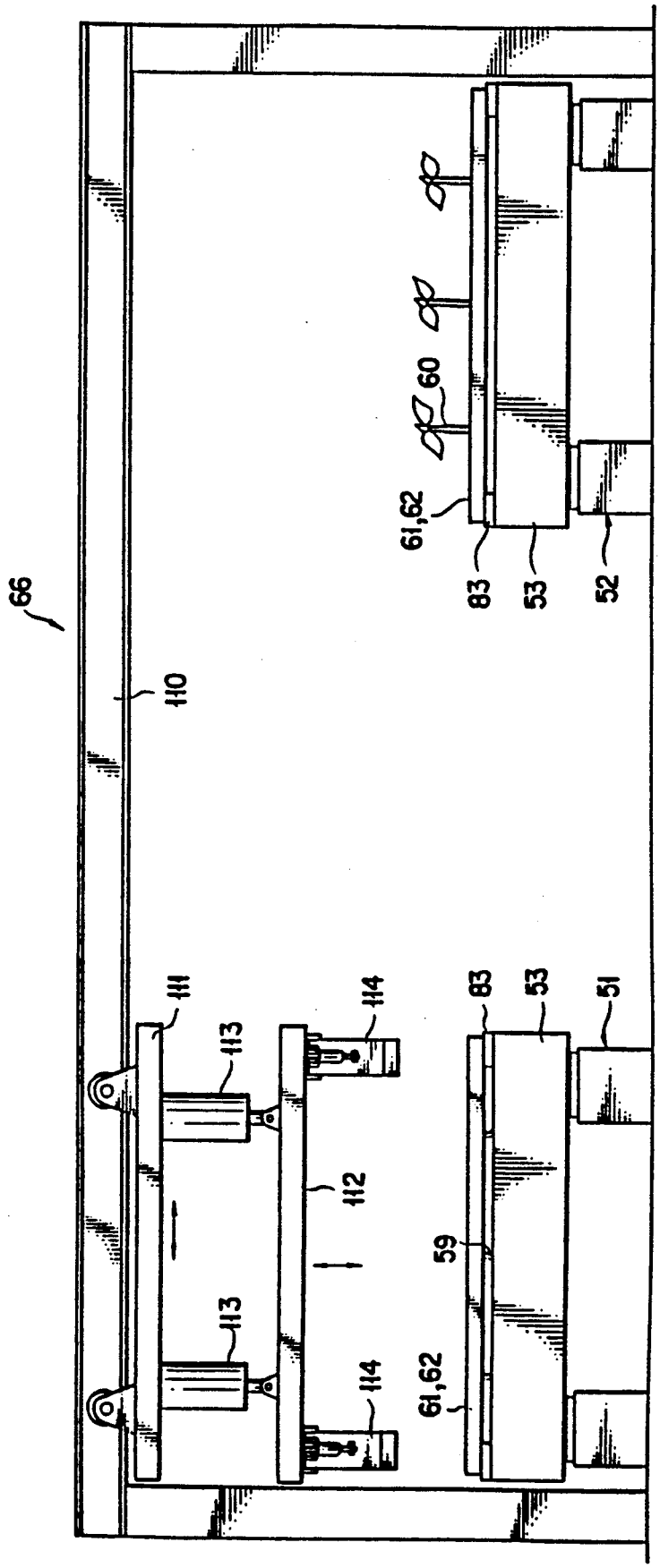
Figure 47:
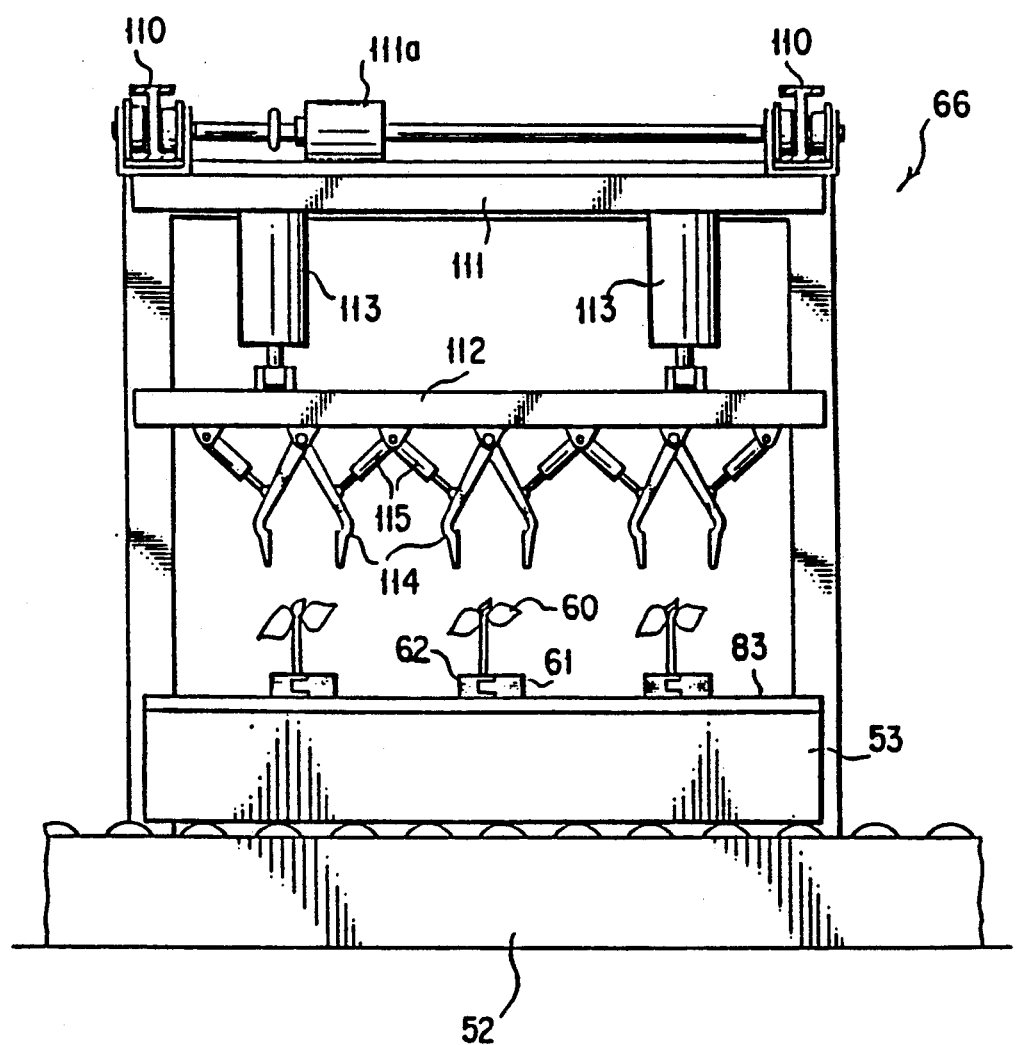

Turning to FIGS. 45 through 47, there is depicted the grafting device 58. Designated at 110 are rails disposed astride of the first and second conveyors 51 and 52. Indicated at 111 is a carriage movably suspended between the upper portions of the conveyors 51 and 52 and driven by a motor 11a. The numeral 112 represents a base board so mounted on the carriage 111 as to be movable up and down by means of a cylinder 113. Arranged in a plurality of lows on the lower surface of the base board 112 are two pairs of hook devices 114 for grasping, from both sides, bilateral portions of the catching plate 61 and of the guide plate 62 in the longitudinal direction during their seizing operations. A hook of the hook device 114 is operated by a cylinder 115.

The function of the grafting device 58 will be described as below.

The operation starts with a movement of the carriage 111 up to a position above the sapling box 54 catered for the scions on the second conveyor 52. Next, the cylinder 113 is stretched to lower the base board 112, and the expanded hook devices 114 are set opposite to both sides of the catching plate 61 and the guide plate 62 which are seizing the sapling box 54. Thereafter, the hook devices 114 is closed by operating the respective cylinders 115 and grasp the plates 61 and 62 which are catching the sapling box, and subsequently the base board 112 ascends. In consequence, the catching plate 61 and the guide plate are lifted while catching the scions 60. At this time, pins 84 by which the plates 61 and 62 are secured to the spacers 83 are removed in such a state that the pins 84 are still fitted to the plates 61 and 62, viz., protruded downwardly of the plates 61 and 62.

Figure 48:
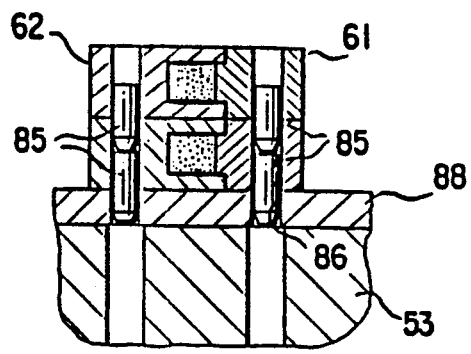

Next, the carriage 111 is moved upwardly of the first conveyor 51, whereas the base board 12 is lowered. The catching plate 61 and the guide plate 62 which are grasped by the hook devices 114 are superposed on the catching plate 61 and the guide plate 62 which are seizing the stock saplings 59 of the sapling box 53. At this time, as illustrated in FIG. 48, the pins 85 projecting downwardly of the plates 61 and 62 on the side of the scions engage with pin holes formed in the both side portions of the plates 61 and 62 for the stocks, whereby these plates 61 and 62 are fitted together. Thereafter, the seizure by the hook devices 114 is released to raise the base board 111.

Owing to the operations discussed above, the cut faces of the scion saplings 60 whose lower parts are cut off along the lower portions of the catching plate 61 and of the guide plate 62 impinge on the cut faces of the stock saplings 59 whose tip parts are cut off along the upper portions of the catching plate 61 and of the guide plate 62.

There is employed the frame releasing device 67 at the frame releasing station 58, which has the same construction as that of the seizing device 63. Operations are reverse to the above-mentioned seizing operations. The catching plate 61 and the guide plate 62 which grasp the scion saplings 60 are at first dismounted, and secondly the plates 61 and 62 which seize the stock saplings 59 are taken off.

Figure 49:
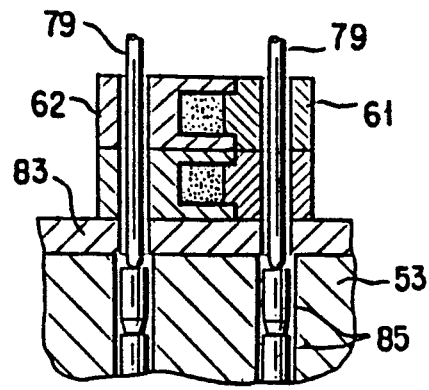

At this time, the engagement of the spacers with the catching plates 61 and the guide plates 62 which are piled up is released by, as illustrated in FIG. 49, removing the stopper pins 85 used for this engagement while pushing the pins toward the stock sapling box 53 with pin pushing rods 79 of a fixing pin driving device 78.

On the basis of the above-described construction, the stock sapling box 53 and the scion sapling box 54 are carried to the seizing station 55 by the first and second conveyors 51 and 52 in synchronization therewith, wherein the stock saplings 59 and the scion saplings 60 which have been raised in these boxes 53 and 54 are seized in array by means of the catching plate 61 and the guide plate 62. These plates 61 and 62 are secured via the spacers 83 to the sapling boxes 53 and 54 with the pins 85.

Thereafter, the sapling boxes 53 and 54 are sent to the cutting station 56 by the conveyors 51 and 52, wherein the stock saplings 59 are cut off with the upper portions of the catching plate 61 and of the guide plate 62 which grasp these saplings, while the scion saplings 60 are cut off with the lower portions of the plates 61 and 62 which likewise seize these saplings.

Figure 50:
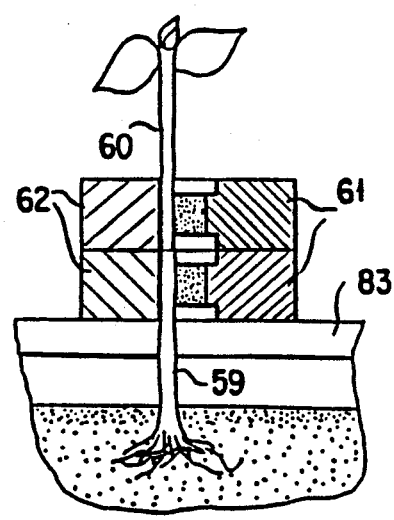
FIG. 50 is a vertical sectional view of the seizing unit on a grafting station.

At a subsequent station, i.e., the grafting station 57, the catching plate 61 and the guide plate 62 which are located above the scion sapling box 54 are superposed on the catching and guide plates 61 and 62 for the stock sapling box 53 while grasping the cut scion saplings 60. The cut faces of the scion saplings 60 are, as depicted in FIG. 50, fitted onto the cut faces of the stock saplings 59 the upper parts of which have been cut off, thus grafting these saplings. At the next frame releasing station 58, the catching plate 61 and the guide plate 62 are taken off from the grafted saplings. However, if impingement grafting is, as illustrated in FIG. 50, simply effected at the grafting station 57, the connections of the saplings require nurture for a few days. Hence, an interval between the grafting station 57 and the frame releasing station 58 corresponds to a time interval needed for the nurture thereof.

Figure 51:
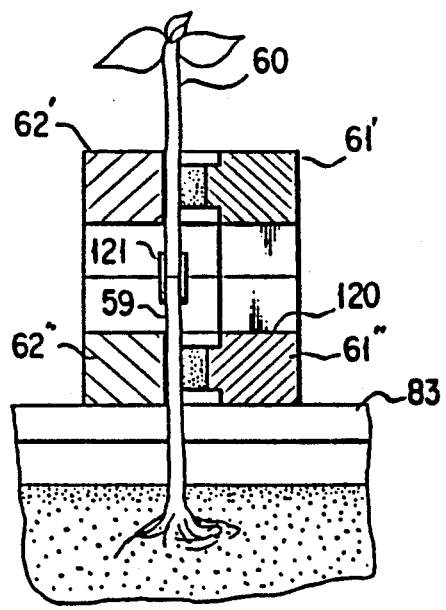
FIGS. 51 and 52 are a vertical sectional and side views each showing another tangible example of the seizing unit.
Figure 52:
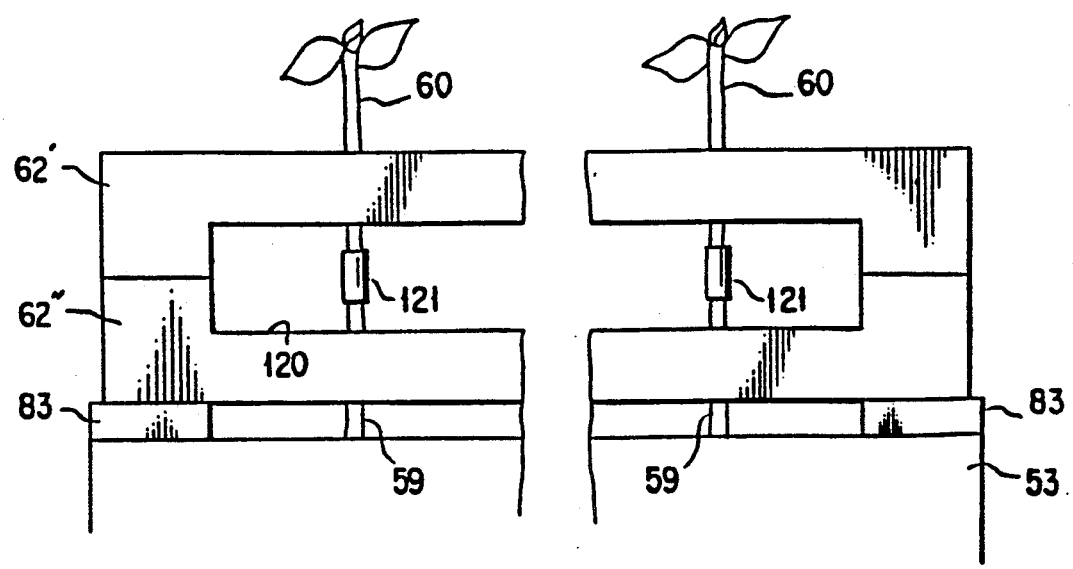

As shown in FIGS. 51 and 52, there are varied configurations of a catching plate 61' and a guide plate 62' which seize the stock saplings 59 and of a catching plate 61" and a guide plate 62" which seize the scion saplings 60, and a window 120 is provided to face to the grafting parts. Each grafting part is retained by winding a tape 121 thereon through this window 120. In this case, frame releasing can immediately be performed at the frame releasing station 58. A grafting clip or a bonding agent may be applied on the grafting part. When using the bonding agent, after impinging the cut faces of the saplings 59 and 60 on each other, the bonding agent is sprayed or coated on this joined part. A configuration of the grafting part of the saplings 59 and 60 is not limited to that shown in the foregoing embodiments, wherein the orthogonally cut faces about against each other. Other possible arrangements are that tilt grafting may be effected by obliquely cutting the saplings; and further split grafting is also practicable, in which one grafting part is split vertically, while the other is intruded thereinto.

Although the illustrative embodiments of the present invention have been described in detail with reference to the accompanying drawings, it is to be understood that the present invention is not limited to those precise embodiments. A variety of modifications or changes may be effected therein by one skilled in the art without departing from the scope or spirit of the invention.

What is claimed is:

1. An apparatus for grafting immature plants, comprising:
   a pair of seizing means for simultaneously seizing a plurality of saplings raised in arrays;
   cutting tools to said plurality of saplings seized by said seizing means with upper portions of said seizing means to obtain stocks but with lower portions thereof to obtain scions, respectively; and
   a means for superposing said seizing means which seizes a plurality of cut stocks obtained by removing the upper parts of said saplings on said seizing means which seizes said cut scions obtained by removing the lower parts thereof and cut faces of said stocks and of said scions are fitted together, wherein upper and lower surfaces of one of said pair of seizing means are provided with plural pairs of induction plates chased with a plurality of induction grooves open to the seizing surface, corresponding to a number of seized saplings and to their positions, said induction plates being protruded from the seizing surface, and with buffer members protruded on the seizing surface of said other seizing means so that each of said buffer members is fitted in between a pair of said induction plates.

2. The grafting apparatus as set forth in claim 1, further comprising: a holding means slidably fitted to said induction and support seizing members which seize said saplings; and a cutting tool having a cutting edge secured to an entire one surface of upper and lower surfaces of said holding means.

3. The grafting apparatus as set forth in claim 1, wherein each of said induction grooves has a V-shape.

4. An apparatus for grafting immature plants, comprising:
   a stock raising box to raise stocks; a scion raising box to raise scions;
   frame members detachably attached to upper ends of said stock and scion raising boxes which are capable of positioning;
   an induction seizing tool including a plurality of induction seizing members; and
   an induction seizing tool including a plurality of support seizing members, wherein said two seizing tools are mounted on said stock and scion raising boxes through said frame members in such a fitting state as to be movable in a seizing direction so that said seizing tools seize said saplings raised in said respective stock and scion raising boxes by use of said support seizing members, and said frame member attached to said scion raising box is positioned and superposed on said stock raising box.

5. The grafting apparatus as set forth in claim 4, characterized in that each of said plurality of induction seizing members is formed with a plurality of induction grooves open to the seizing surfaces, corresponding to the number of said saplings to be seized and positions thereof and includes a pair of induction plates so attached to upper and lower surfaces of said induction seizing member as to protrude from the seizing surface, and each of said plurality of support seizing members includes buffer members so protruded from the seizing surface of said support seizing member as to fit in between said pairs of induction plates.

6. The grafting apparatus as set forth in claim 5, wherein each of said induction grooves has a V-shape.

7. The grafting apparatus as set forth in claim 4, further comprising: a holding means slidably fitted to said induction and support seizing members which seize said saplings; and a cutting tool having a cutting edge secured to an entire one surface of upper and lower surfaces of said holding means.

8. An apparatus for grafting immature plants, comprising:
   a first conveyor for sequentially carrying a plurality of stock raising boxes;
   a second conveyor, laid in parallel with said first conveyor, for sequentially carrying a plurality of spicate segment raising boxes;
   seizing, cutting and grafting stations, arranged sequentially from an upstream side in the carrying direction of said two conveyors; a frame releasing station provided in continuation from said grafting station on the lowest stream side in the carrying direction of said first conveyor;
   seizing means, mounted on said respective seizing stations of said first and second conveyors, for seizing said saplings raised in array within said sapling raising boxes by use of an induction seizing member and a support seizing member and fixing said seizing members onto said sapling raising boxes in a state where said seizing members seize said saplings;
   a stock cutting means, mounted on said cutting station of said first conveyor, for cutting said saplings catered for stocks with upper portions of its seizing unit;
   a scion cutting means, mounted on said cutting station of said second conveyor, for cutting said saplings catered for scions with lower portions of said seizing unit thereof;
   a grafting means, mounted on said grafting station of said first conveyor, for fixedly superposing said scion saplings cut and separated from the lower parts of said saplings by the lower portions of said seizing unit while being seized by said seizing members on a sapling raising box for stocks obtained by cutting the upper parts of said saplings with the upper portions of said seizing unit, the lower parts thereof being seized by said seizing members; and
   a frame releasing means, mounted on said frame releasing station, for taking off said seizing members which seize said saplings after completely grafting said saplings.

9. The grafting apparatus as set forth in claim 8, characterized in that each of said plurality of induction seizing members is formed with a plurality of induction grooves open to the seizing surfaces, corresponding to the number of said saplings to be seized and positions thereof and includes a pair of induction plates so attached to upper and lower surfaces of said induction seizing member as to protrude from the seizing surface, and each of said plurality of support seizing members includes buffer members so protruded from the seizing surface of said support seizing member as to fit in between said pairs of induction plates.

* * * * *

UNITED STATES PATENT AND TRADEMARK OFFICE
CERTIFICATE OF CORRECTION

PATENT NO. : 5,209,011
DATED : May 11, 1993
INVENTOR(S) : Tatsuya Mori, et al

It is certified that error appears in the above—identified patent and that said Letters Patent is hereby corrected as shown below:

In column 15, claim 1, line 17, "cut" should be inserted after --tools to--

Signed and Sealed this

Twenty-second Day of February, 1994

Attest:

BRUCE LEHMAN

Attesting Officer     Commissioner of Patents and Trademarks